United States Patent
Weinberg et al.

(10) Patent No.: US 12,198,567 B2
(45) Date of Patent: Jan. 14, 2025

(54) METHOD AND APPARATUS OF MATH EDUCATION

(71) Applicant: 101 Edu, Inc., Toronto (CA)

(72) Inventors: Justin Weinberg, New York, NY (US);
Igor Belyayev, New York, NY (US);
Ben Langton, Paso Robles, CA (US);
Thomas Redis, New York, NY (US)

(73) Assignee: TOPHATMONOCLE (US) CORP. (CA)

( * ) Notice: Subject to any disclaimer, the term of this patent is extended or adjusted under 35 U.S.C. 154(b) by 0 days.

(21) Appl. No.: 17/966,982

(22) Filed: Oct. 17, 2022

(65) Prior Publication Data

US 2024/0127712 A1   Apr. 18, 2024

(51) Int. Cl.
*G09B 19/02* (2006.01)
*G06F 9/48* (2006.01)
*G09B 7/08* (2006.01)

(52) U.S. Cl.
CPC ......... *G09B 19/025* (2013.01); *G06F 9/4843* (2013.01); *G09B 7/08* (2013.01)

(58) Field of Classification Search
CPC ........ G09B 19/025; G09B 7/08; G06F 9/4843
See application file for complete search history.

(56) References Cited

U.S. PATENT DOCUMENTS

| | | | |
|---|---|---|---|
| 4,428,044 A * | 1/1984 | Liron | G06F 11/1679 714/12 |
| 5,902,114 A | 5/1999 | Erickson | |
| 6,540,520 B2 * | 4/2003 | Johnson | G09B 7/02 706/14 |
| 7,752,148 B2 | 7/2010 | Yu | |
| 9,092,317 B2 | 7/2015 | Jacobson | |
| 11,605,305 B2 * | 3/2023 | Kim | G09B 7/02 |
| 2005/0114776 A1 * | 5/2005 | Wood | G09B 5/062 715/705 |
| 2008/0280280 A1 * | 11/2008 | Romer | G09B 7/06 434/356 |
| 2013/0164719 A1 * | 6/2013 | Villamar | G09B 19/025 434/201 |

(Continued)

OTHER PUBLICATIONS https://graspablemath.com/canvas , Sep. 27, 2021.

*Primary Examiner* — Eddy Saint-Vil
(74) *Attorney, Agent, or Firm* — Fishman Stewart PLLC

(57) ABSTRACT

A back-end computing system configured to determine i) a first mathematical operation a user may carry out on a first mathematical expression and ii) a second mathematical operation the user may carry out on the first mathematical expression. To minimize processing loads on a user computing device, the system also provides to a mathematics application operating on the user computing device instructions to allow the user to attempt to carry out the first mathematical operation and the second mathematical operation. Further, the system determines i) an accurate outcome and an inaccurate outcome of performing the first mathematical operation and then provides the accurate outcome and the inaccurate outcome to the mathematics application. The system then receives an indication of a second mathematical expression from the mathematical application, where the second mathematical expression is based on the first mathematical operation and a selection of the inaccurate outcome by the user.

17 Claims, 16 Drawing Sheets

(56) References Cited

U.S. PATENT DOCUMENTS

| | | | |
|---|---|---|---|
| 2014/0272910 A1* | 9/2014 | del Ninno | G09B 7/06 |
| | | | 434/362 |
| 2015/0269868 A1* | 9/2015 | Carney | G09B 7/02 |
| | | | 434/188 |
| 2016/0171902 A1* | 6/2016 | Lan | G06F 17/10 |
| | | | 434/336 |
| 2016/0364115 A1* | 12/2016 | Joung | G09B 5/02 |
| 2017/0084190 A1* | 3/2017 | Devlin | G09B 7/04 |
| 2017/0084197 A1* | 3/2017 | Crouse | G09B 5/00 |
| 2019/0096283 A1* | 3/2019 | Afshar | G09B 5/02 |

* cited by examiner

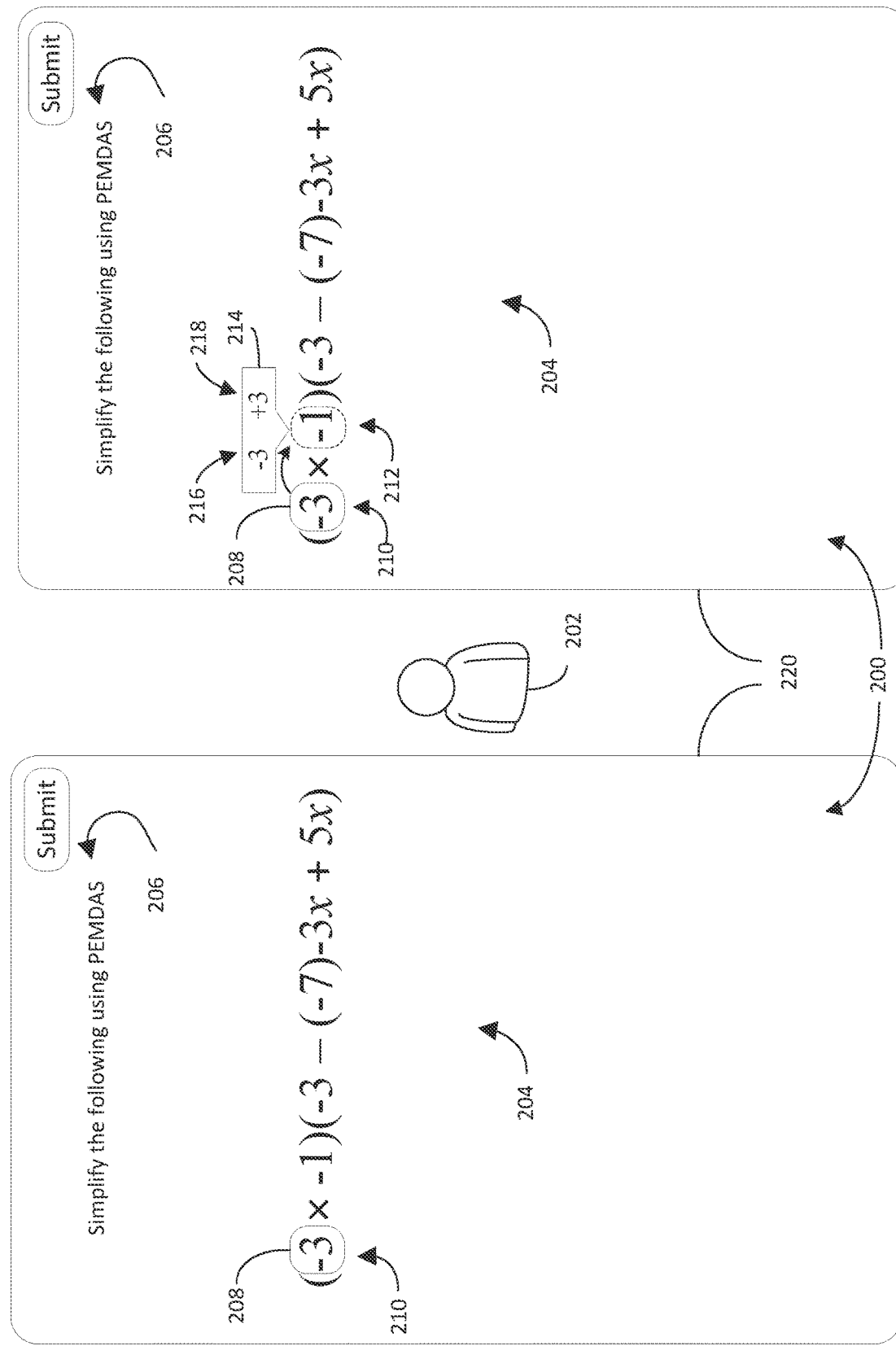

Simplify the following using PEMDAS $$3(10 - 3x + 5x)$$

Simplify the following using PEMDAS $$3(10 + 2x)$$

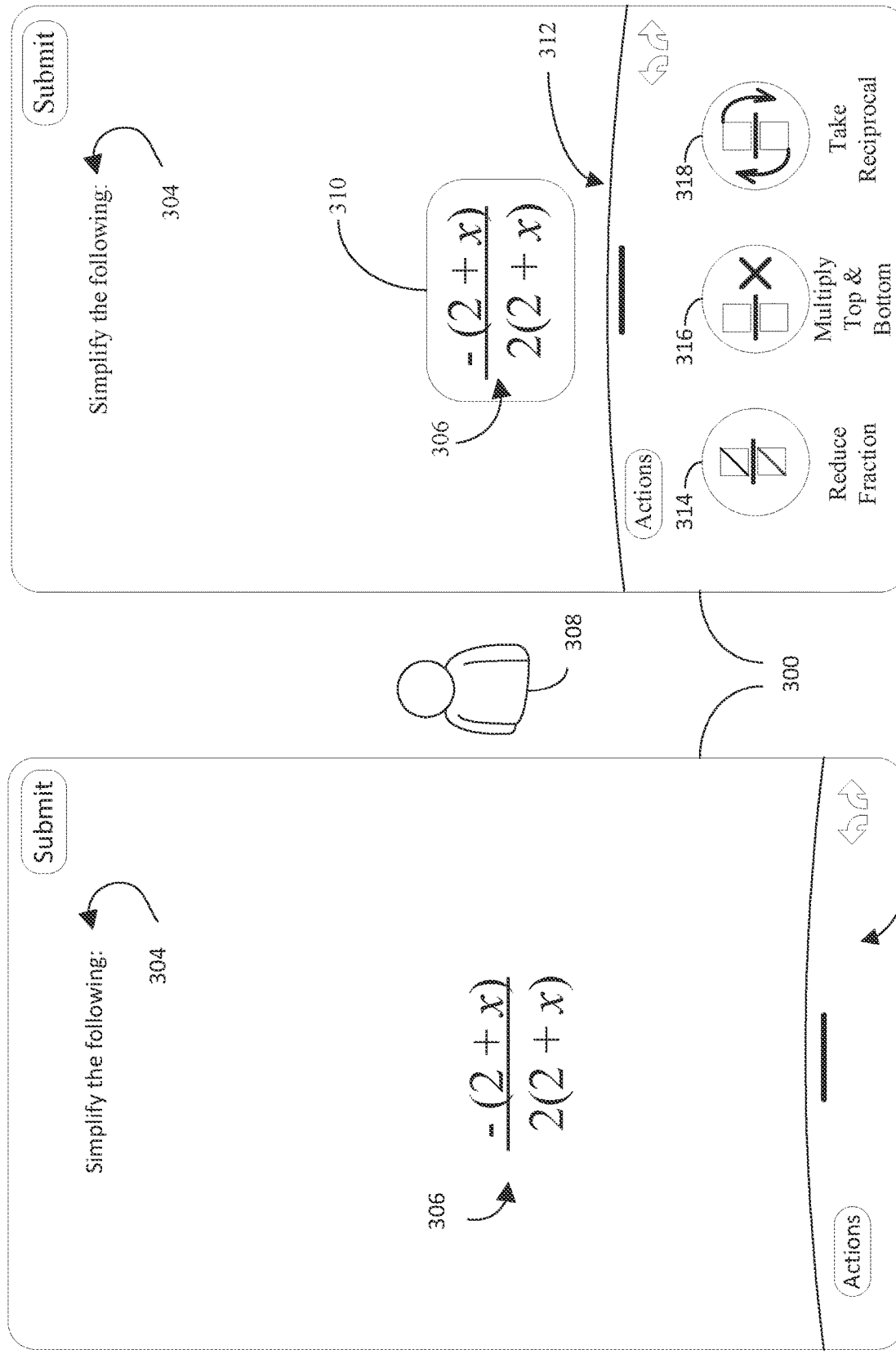

METHOD AND APPARATUS OF MATH EDUCATION

FIELD OF TECHNOLOGY

An improved mathematics education system and method are disclosed. Improvements are applicable to the field of mathematics education.

BACKGROUND

In the field of mathematics education, computer applications that allow users to work through math problems may be employed. These applications often serve as a general-purpose math tools.

During operation, such applications often offer a problem to be solved. In some instances, these applications may merely carry out calculations as the user manipulate variables. In other instances such applications may offer "solutions" in a multiple-choice type of format, where one of the solutions is an accurate solution. The user is then given the opportunity to select one of the choices as a solution. Following the selection, the user may be notified if the selection was accurate or not. With these types of math tools, however, the user is often not given any information beyond whether or not the right answer has been selected. For example, if a multistep math problem is presented, the user may only be notified if the final answer is correct or not. In other words, the user may be notified that the offered solution is not correct, but may not be notified as to which step in a multi-step solution the user erred. Accordingly, many mathematics applications do not engage the user at a granular level.

Mathematics education applications may also include an interface having application mechanics that rely heavily on drop-down windows and other cumbersome interfaces. These application mechanics, however, may be frustrating to navigate.

Thus, there is a need for mathematics education systems and applications that maximize a user's engagement while at the same time minimizing user frustration with the application mechanics.

BRIEF DESCRIPTION OF THE DRAWINGS

FIGS. 2A-2I illustrate exemplary operations of an exemplary mathematics education application operating on a user device;

FIGS. 3A-3E illustrate additional exemplary operations of an exemplary mathematics education application operating on a user device;

DETAILED DESCRIPTION

Figure 1:
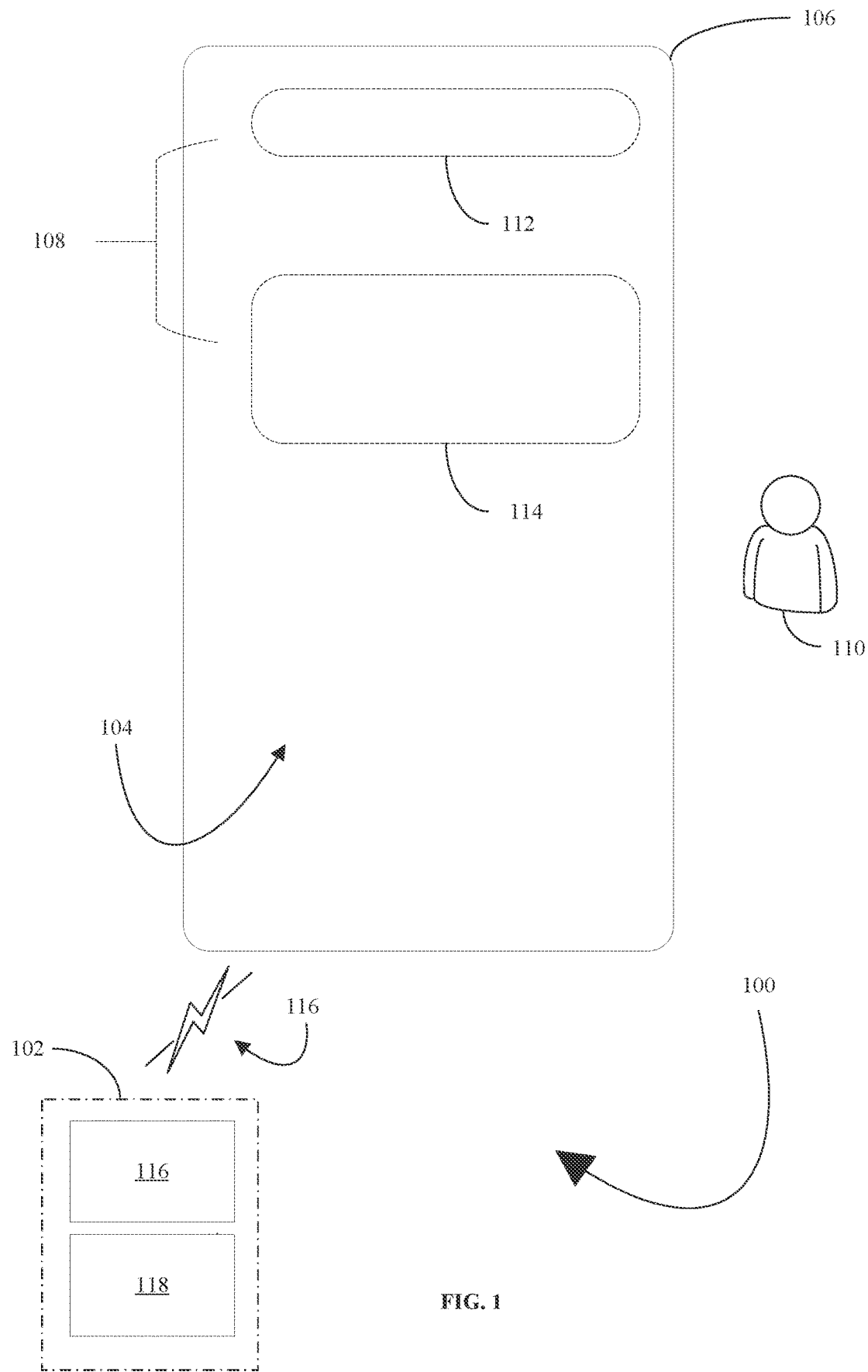
FIG. 1 illustrates an exemplary mathematics education system.

FIG. 1 illustrates an exemplary mathematics system 100 that includes a back-end or remote computing system 102 (e.g., a cloud computing system) and an interactive mathematics application 104 that operates on a user or front-end device 106 (e.g., a smart phone, computer tablet, a personal computer, or etc.). The back-end computing system 102 is geographically remote from the user device 106 (a.k.a., user computing device).

The mathematics system 100 presents a mathematics problem 108 to a user 110 via the interactive mathematics application 104. The mathematics problem 108 may include a directive 112 and, in some instances, an equation or mathematical expression 114 (or set(s) of mathematical expressions). The directive 112 may direct the user 110 to manipulate the expression 114 to provide some type of solution. For example, with regard to a given expression 114, the directive 112 may direct the user 110 to "Solve for X," "Factor the Equation," or "Simplify the given expression using PEMDAS." PEMDAS generally refers to employing the orders of operation rule (i.e., PEMDAS: Parentheses, Exponents, Multiplication and Division (from left to right), Addition and Subtraction (from left to right)). Other directives not listed are contemplated.

In some instances the problem 108 may be a word problem, where the directive 112 is included therein.

As will be described in further detail below, the mathematics system 100 allows the user 110 to manipulate the problem 108 or expression 114 in an attempt to satisfy the directive 112.

The user device 106 may provide computing power for the mathematics system 100. However, and as will be described below, the remote system 102 (e.g., a back-end computing system) carries out the computationally intensive tasks. The remote system 102 provides the outcomes of these computationally intensive tasks to the user device 106 via a network connection 116 (e.g., internet and/or etc.). Accordingly, a technical advantage of relying on the remote system 102 for these computationally intensive tasks, is that the processing loads on the user device 106 are minimized.

The remote system 102 may, for example, be an offsite compute system or systems such as a cloud compute system. This remote or back-end system 102 may include a memory 116 and at least one CPU 118 to carry out techniques and other tasks described herein. Though not shown, the user device 106 also includes one or more memory units and one or more CPUs top interact with instructions.

Figures 2C, 2D:
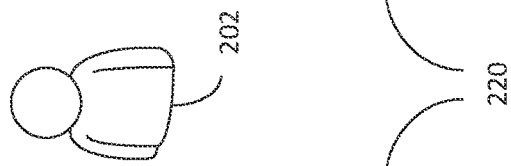

With reference now to FIGS. 2A-2I, exemplary user engagement with an exemplary mathematics application 200 (e.g., application 104 of FIG. 1) is shown. Referring now to FIGS. 2A and 2B, a user 202 was provided an exemplary first expression 204 (i.e., "(−3x−1)(−3−(−7)3x+5x)") and an exemplary directive 206 (i.e., "Simplify the following using PEMDAS:") by the mathematics application 200.

In the exemplary engagement scenario shown in FIG. 2A-2B, the user 202 first attempts to simplify the first expression 204 using PEMDAS by carrying out the negative 3 times negative 1 operation (i.e., −3x−1). As such, in an attempt to carry out the directive 206, the user 202 begins by making a first selection 208 (a.k.a. source selection or indicator) from the first expression 204 and causes the first selection 208 to move from a first position 210 to a second position 212 (a.k.a. drop zone or destination site). Rather than simply carrying out the operation for the user 202, the mathematics application 200 may provide exemplary choices 214 for the outcome of the manipulation or operation to engage the user 202 in the learning process. That is, rather than simply providing the user 202 the answer to the "(−3x−1)" operation, the user 202 may be provided a set of exemplary choices 214.

As illustrated in FIG. 2B, the user 202 is provided an exemplary first option 216 and an exemplary second option 218. In other examples, however, the user 202 may be provided additional options or no options (i.e., the "(−3x−1)" operation may simply be carried out to show a result of "3").

Though not shown, indications may be provided to the user 202 to show that the first selection 208 is being manipulated. For example, a phantom of the "−3", or some other type of indication, may be shown moving from the first position 210 towards the second position 212 to indicate an attempt to carry out the "−3x−1" operation is being made. Further, interactions (e.g., selection 208 and movement thereof) of the first expression 204 may be carried out by the user 202 in a variety of ways. For example, one or more finger touches on a display 220 and/or drags across the display 220 may be employed to carry out manipulations or interactions. Still other manipulation techniques may employ, for example, mouse or voice inputs.

With continued reference to FIGS. 2A and 2B, once the choices 214 are presented, the user 202 is allowed to make a selection (outcome) from the choices 214 to change the first expression 204. As evident from the example illustrated in FIG. 2B, not all the choices 216, 218 are accurate or correct outcomes of the manipulation. That is, while the second choice 218 (+3) is the correct outcome to the "−3x−1" operation, the first choice 216 (−3) is not the correct outcome. Accordingly, since both are selectable choices or options, the user 202 may be given the opportunity to make mistakes. The mathematics application 200 generally presents at least one accurate solution (e.g., "+3", 218) and at least one inaccurate solution (e.g., "−3" 216).

Once a selection is made (e.g., choice selection by a finger-tap input), the mathematical expression changes to comport with the selection. The application may then allow the user to continue to manipulate the expression. In the example scenario represented in FIGS. 2B and 2C, the user 202 has selected the second option 218 (i.e., the correct choice) and, as such, the first mathematical expression 204 changes from (−3x−1)(−3−(−7)−3x+5x) shown in FIG. 2B to a second mathematical expression 222 (i.e., "3(−3−(−7)−3x+5x)") shown in FIG. 2C.

FIG. 2D illustrates another exemplary manipulation or operation performed by the user 202. In the example shown, the user 202 selected 224 the "−3" and caused the "−3" to move to the "−(−7)" subexpression. Accordingly, the following four exemplary choices were provided to the user 202 for selection: a "−10" option 226, a "+10" option 228, a "−4" option 230, and a "+4" option 232. As evident from FIG. 2E, the user 202 selected the "+10" option 228. Though this is an incorrect choice or answer to the "−3−(−7)" operation, the user 202 is allowed to continue and the second expression 222 (i.e., 3(−3−(−7)−3x+5x)) of FIG. 2D changes to a third expression 234 (i.e., "3(10−3x+5x)") shown in FIG. 2E to comport with the user's selection.

FIGS. 2E-2F illustrate an outcome of a further manipulation or operation performed by the user 202, though intermediary options and selection thereof are not shown. That is, through manipulation (adding −3x to 5x), the user 202 has accurately changed the third expression 234 to a fourth expression 236 (i.e., "3(10+2x)").

Figure 2H:
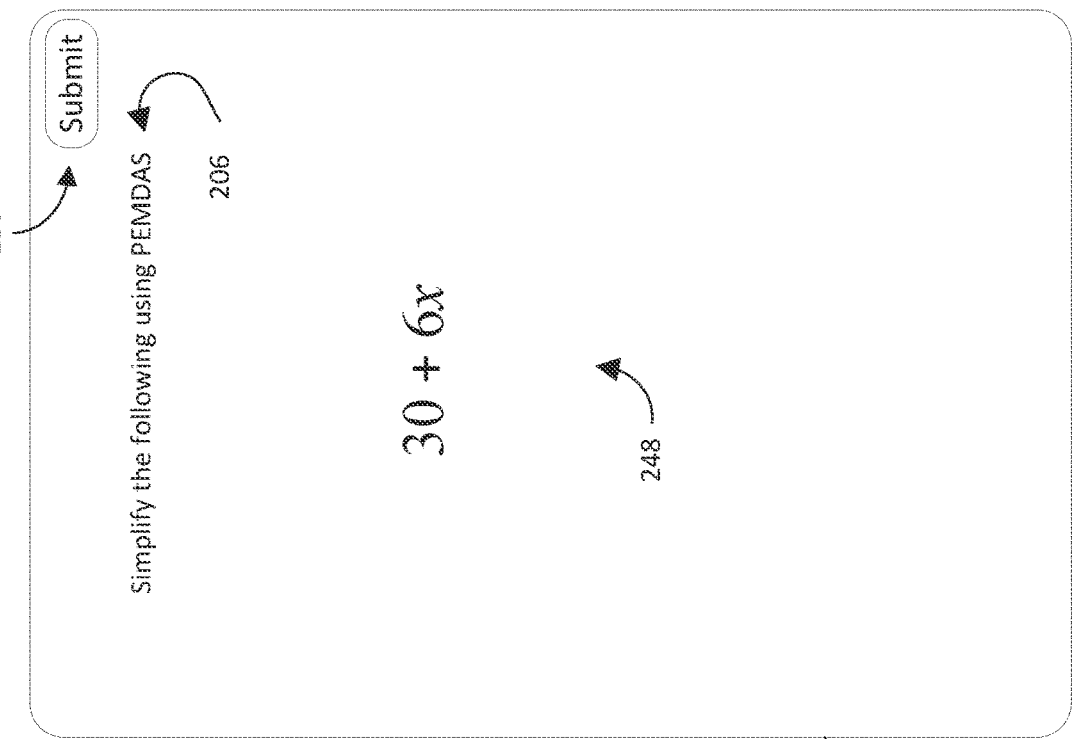
Figure 2G:
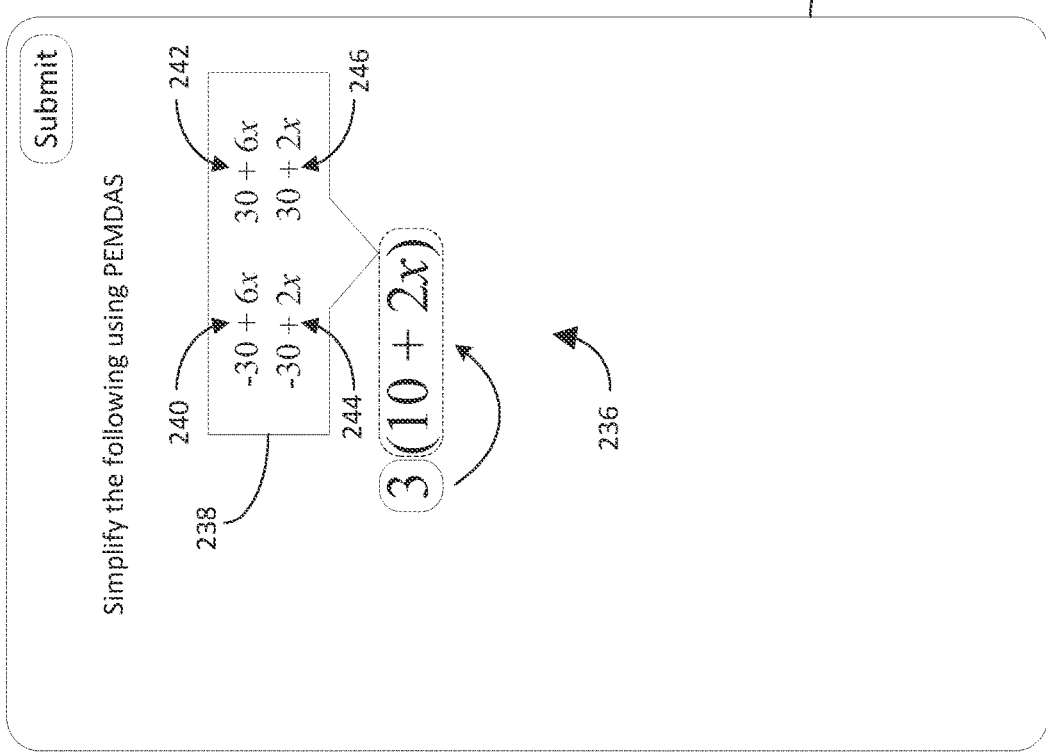

Yet another exemplary manipulation is represented in FIG. 2G. In the example shown, the user 202 has caused the "3" to be distributed over the "10+2x" portion of the fourth expression 236. Accordingly, a set of exemplary choices 238 are presented. These exemplary choices include a "−30+6x" option 240, a "30+6x" option 242 (the correct option), a "−30+2x" option 244, and a "30+2x" option 246. As evident from FIG. 2H, the user 202 has selected the "30+6x" option 242 of FIG. 2G to change the fourth expression 236 to a fifth expression 248 shown in FIG. 2H.

While not shown in FIGS. 2A-2H, choices need not be provided for every manipulation. For example, with reference to FIG. 2G, instead of providing choices 238 to the user 202, the manipulation may simply be carried out. That is, instead of providing choices to the user as the user distributes the "3" over the subexpression "(10+2x)", the accurate solution of 30+6x may simply be provided.

Once the user feels that the directive (e.g., directive 206) has been satisfied, the user may submit a final answer. For example, in the exemplary scenario represented in FIGS. 2H and 2I, the user 202 selects (e.g., taps) a submit indicator 250 (FIG. 2H) and an exemplary timeline 252 (FIG. 2I) is presented to the user 202. The user 202 is also notified whether or not the submitted answer is correct. Further, the user may also be notified whether or not the step(s) taken by the user to reach the submitted answer were valid or not. Often, when the final answer is correct, the step(s) taken to reach the final answer are valid. There are examples, however, where a final answer may be correct though one or more invalid steps were taken to reach the final answer.

Figure 2I:
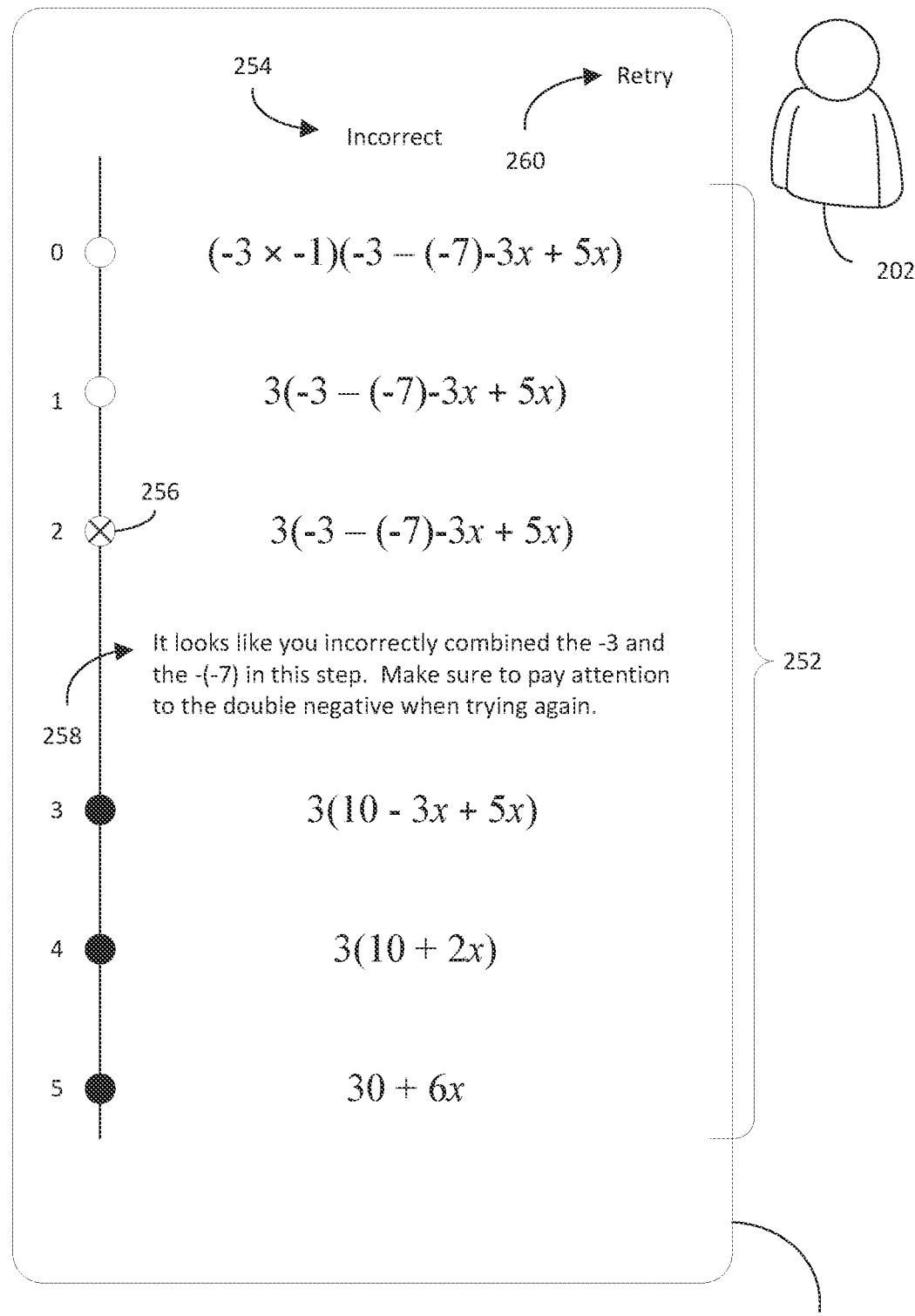

With continued reference to FIG. 2I, since the solution (i.e., the fifth expression 248) illustrated in FIG. 2H was not correct, the user 202 is notified that the submitted answer is not correct via an exemplary accuracy indicator 254. Alternatively, if the user solution were correct, the user would instead be notified that the submitted solution was correct via the accuracy indicator 254.

Though not shown in the example of FIG. 2I, and as discussed above, a "final" answer may be correct though intermediary step(s) completed by the user may not be valid. As such, one or more indicators may be employed to point out to the user what step(s) were not properly completed, though the "final" answer may be correct.

With reference back to FIG. 2I, the exemplary timeline 252 may be employed to indicate which step(s) or interaction(s) were in error (i.e., invalid), if any. For example, as shown in FIG. 2I an exemplary error indicator 256 (e.g., "X" indicator) notifies the user 202 which step was carried out in error (i.e., is invalid). Depending on the user interactions, other examples may present additional error indicators or no error indicators.

The timeline 252 of FIG. 2I may also provide a hint or feedback 258 (see further discussion of feedback below with respect to FIG. 7) to the user 202 if an error did occur. The feedback 258 is intended to provide guidance to the user 202 without explicitly providing the solution. Accordingly, the user 202 is actively engaged in problem solving.

If desired, the user 202 may retry satisfying the directive by tapping a retry icon or indicator 260. In such an instance, the mathematics application 200 (see FIG. 2A) may again provide the first expression 204 along with the directive 206 so the user 202 may once again attempt to satisfy the directive 206.

As represented in FIGS. 2A-2I, the user 202 actively navigates through problem solving scenarios to satisfy a directive (e.g., directive 206). When the user is ready, the "final" answer may be submitted. A timeline, representing the steps the user carried out, may be provided to the user. The timeline may notify the user which step(s) were accurate and which were not, if any. Further, the timeline may provide feedback to help the user reach the correct answer. In other examples, however, the system may provide feedback to the user after each step is submitted in a stepwise manner. That is, instead of providing a timeline (e.g., the timeline 252 of FIG. 2I) after the user has completed multiple steps, feedback may be provided after each step, or at least after each step in which an error occurred. For example, with regard to the scenario represented in FIGS. 2D and 2I where the user improperly carried out the "−3−(−7)" operation, the system may notify the user that an error has occurred before the user proceeds to the next step (e.g., the step represented in FIG. 2F). Further, the system may provide feedback (e.g., the hint 258 of FIG. 2I) at the same time. Accordingly, feedback may be provided as the user works through a solution pathway.

As shown in FIGS. 2A-2I, the user 202 is actively engaged in problem-solving and is given the opportunity to make mistakes and learn from those mistakes. Further the use of feedback (e.g., the hint 258 of FIG. 2I) may guide the user, while also minimizing frustration as the user attempts to correct any incorrect solutions submitted.

In addition to allowing the user to carry out the interactions or manipulation represented in FIGS. 2A-2H, the mathematics application 200 may aid the user in carrying out more complex manipulations. FIGS. 3A-3D illustrate some of these exemplary complex actions that may be carried out by a user.

FIG. 3A illustrates a display 300 and a mathematical application 302 providing a directive 304 with a first mathematical expression 306 associated therewith. A user 308 engages with the display 300 to attempt to satisfy the directive 304.

FIG. 3B indicates that the user 308 has selected the entire first mathematical expression 306 as represented by an exemplary selection indicator 310. While FIG. 3B represents the selection indicator 310 as a border around the expression 306, other indicators may instead be employed. For example, the selection indicator may be represented by changing the color of the expression or by some other visual representation understandable to the user 308.

With continued reference to FIG. 3B, the user 308 may carry out complex operations on the selection 310 by engaging with an exemplary action menu 312. Exemplary "Actions" 314-318 of the action menu 312 are shown. In some instances, the action menu 312 and its choice 314-318 may automatically be displayed based on the subexpressions selected. These instances will be described in further detail below with respect to FIG. 4.

With continued reference to the exemplary scenario represented in FIG. 3B, the user 308 is provided an exemplary "Reduce Fraction" feature 314, an exemplary "Multiply Top & Bottom" feature 316, and an exemplary "Take Reciprocal" feature 318, each allowing the user 308 to carry out complex actions on the selection 310. Each feature or action 314-318 will operate on, and is relevant to, the selection chosen by the user 308. Other examples may provide more or less than three actions.

As previously mentioned, the example shown indicates that the entire exemplary first expression 306 is selected as shown by the selection indicator 310. Other examples, however, may only include a portion of an expression selected. Accordingly, action features (e.g., features 314-318) relevant to that selection may be provided. In other words, action features provided are dependent of the expression and/or portions of the expression selected.

Figure 3D:
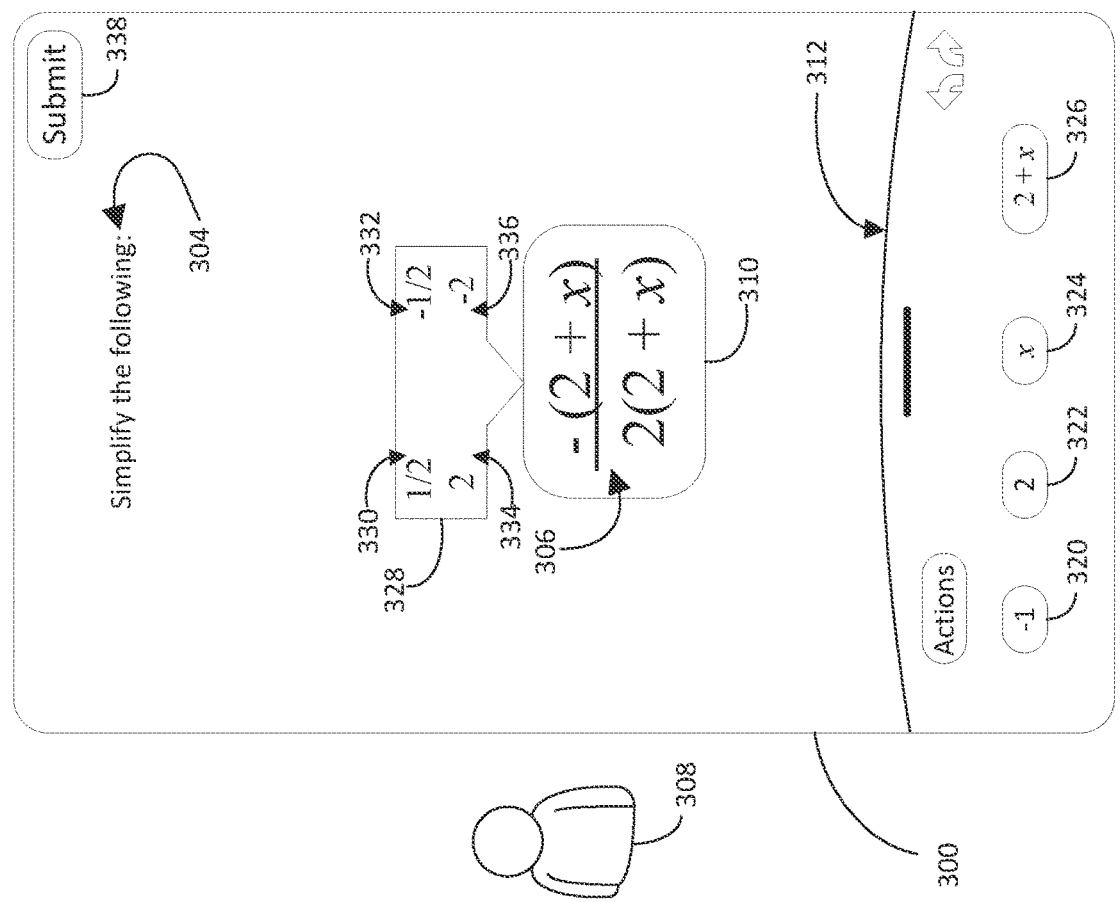
Figure 3C:
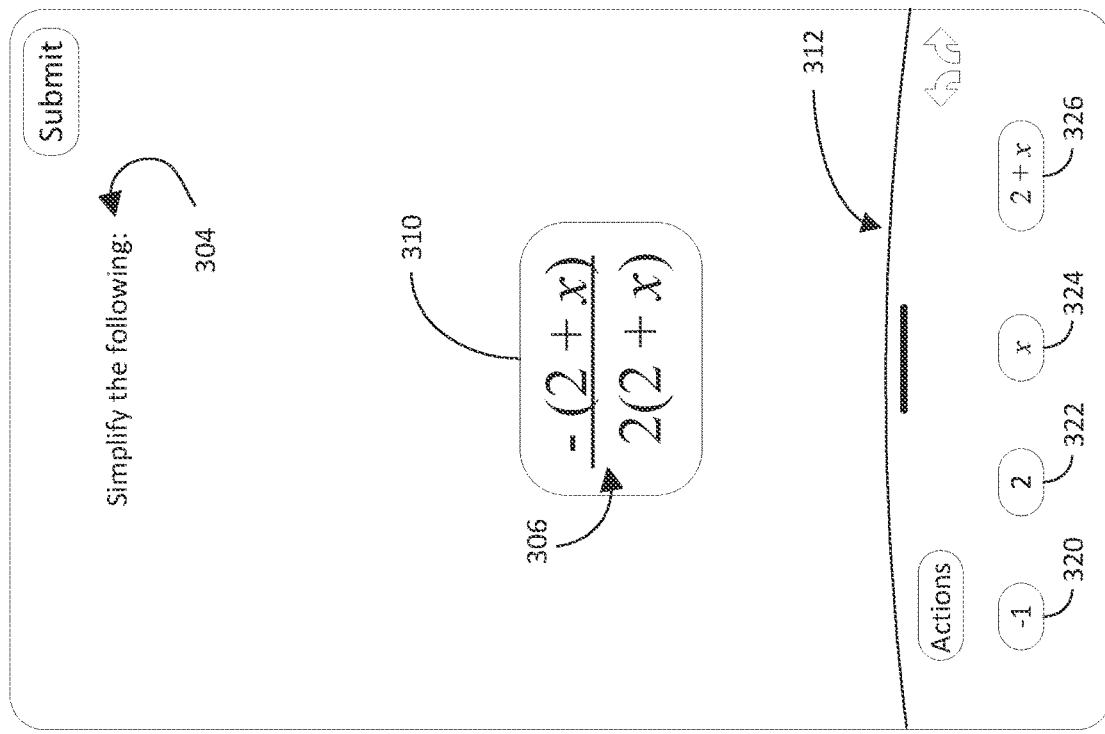
Figure 3E:
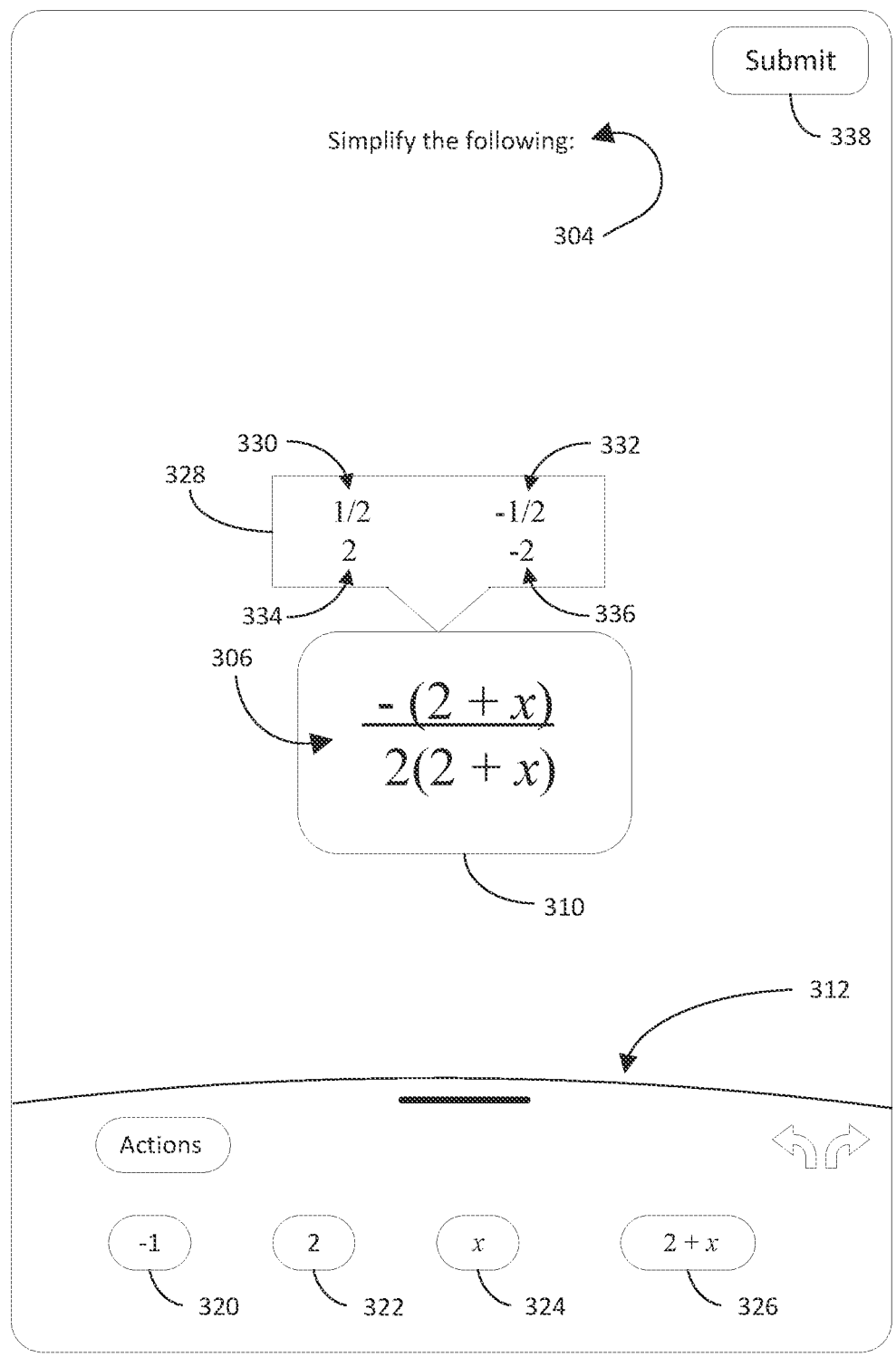

With reference now to the exemplary scenario represented in FIGS. 3B and 3C, the user 308 has selected the "Reduce Fraction" feature 314 represented in FIG. 3B and, as such, exemplary choices 320-326 of FIG. 3C are presented to the user 308. With regard to the example shown, each choice 320-326 represents a factor by which the expression 306 may be reduced. If, for example, the user 308 decides to reduce the first expression 306 by (2+x), the user 308 selects the "2+x" option 326. As such, the mathematics application 302 may simply reduce the expression by (2+x) and present $-\frac{1}{2}$ to the user 308.

Alternatively, and as shown in FIG. 3D, the mathematics application 302 may present the user 308 a set of choices 328 when, for example, the "2+x" option 236 is selected. In the example shown, the choices include a "$\frac{1}{2}$" option 330, a "$-\frac{1}{2}$" option 332, a "2" option 334, and a "−2" option 336. Accordingly, the user 308 continues to be actively engaged in problem solving activities.

When the user 308 believes that the directive 304 has been satisfied, the user may engage with a "submit" indicator 338. Though not shown, the mathematics application 302 may again present an indicator of accuracy, a timeline, and/or one or more hints relevant to the user interactions (see, e.g., FIG. 2I).

As illustrated in FIGS. 1-3D, a user is able to actively engage with a mathematics system or application in a visual and tactile manner. Through this engagement, the user may build flexible problem solving strategies. In addition to the features discussed above, the speed at which the mathematics system or application operates helps to keep a user engaged. There is little, if any, delay as the user manipulates each expression.

Figure 4:
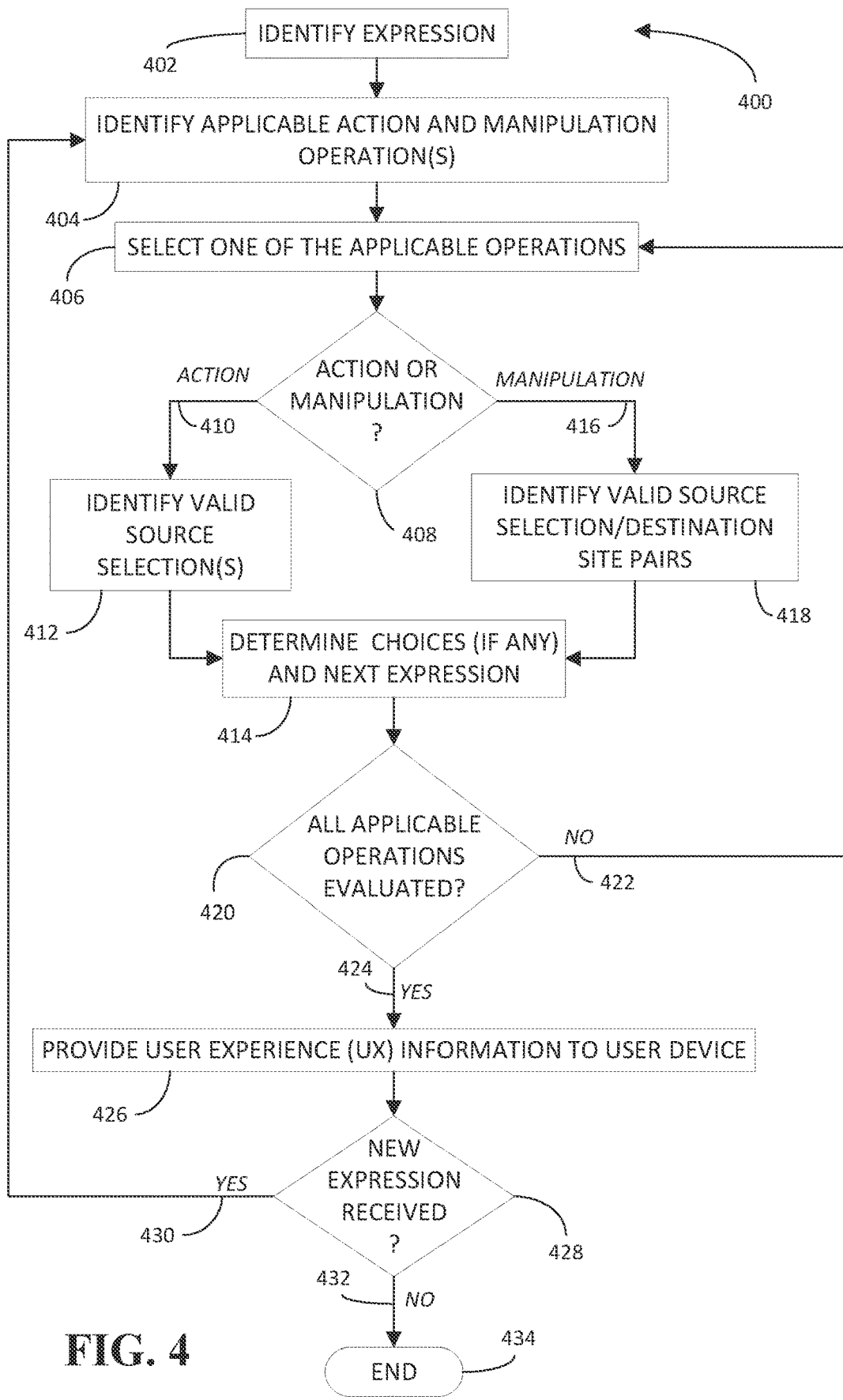
FIG. 4 illustrates an exemplary expression mapping technique that may be carried out by a back-end computing system that interacts with the mathematics education application.

As discussed above with respect to FIG. 1, a remote or back-end computing system 102 of the mathematics system 100 carries out computationally intensive tasks. An exemplary expression mapping technique 400 shown in FIG. 4 represents a computationally intensive technique that may be carried out by a back-end system to minimize the computational load on the on the front-end system (e.g., the user device 106). Accordingly, delays on the front-end system are minimized, thus keeping the user engaged. Via the exemplary expression mapping technique 400, the user is able to manipulate expressions and carry out acts thereon in an efficient manner.

The exemplary expression mapping technique 400 begins at block 402, where an expression (e.g., expression 204, 222, 234, 236, or 248 of FIGS. 2A-2H or expression 306 of FIGS. 3A-3E) is identified or received by a back-end system (e.g., remote system 102 of FIG. 1). The expression may be provided to the back-end system by a user device (e.g., the user device 106 of FIG. 1). Further, though not shown, the mathematical expression could include one or more sets of expressions (e.g., a system of equations).

At block 404, process control identifies each applicable action and/or manipulation operation that may be carried on the expression. These applicable operations may include, for example, one or more of fractional operations, additive operations, multiplicative operations, and divisional operations. An action operation includes complex operations where the user is provided with one or more operational types or actions to choose from. For example, with reference to FIG. 5, an expression 500 is shown. The expression includes a first portion 502, a second portion 504, and a third portion 506. Upon selection 508 of the first portion 502 of the expression 500, a user is provided a plurality of operational types or actions 510, 512, 514 to choose from (see also, e.g., choices 314-308 of FIG. 3B). These operations, and others like them, are action operations.

A manipulation operation, on the other hand, represents manipulations carried out by the user that effectively end with an outcome. For example, a manipulation operation may be represented as a user manipulates the second portion 504 of the expression 500 and attempts to carry out the "−3x−1" operation (see also e.g., FIGS. 2A and 2B). While the user may be provided a plurality of choices (e.g., choices 214 of FIG. 2B) for the outcome of the operation, the user is not offered a choice of actions to choose from. Rather, the user is simply manipulating the expression 500 or subexpression thereof, FIG. 5. This is in contrast to the example discussed above, where the user carries out an action operation by making a selection 508 and, as a result, is offered a plurality of actions 510-514 to choose from.

With reference back to FIG. 4, heuristics may be employed to identify the applicable operations at block 404. A pattern matching engine may employ these heuristics to search the expression (a.k.a., active expression) for applicable operations. For example, twenty-four heuristics may represent all possible operations. Process control may search the expression for patterns that indicate that the expressions include patterns represented in one or more of the twenty-four different heuristics. As such, in this example, after process control completes the identification at block 404, twenty-four or fewer allowable operations in the expression will have been identified. While the example above represents all possible operations with twenty-four heuristics, other examples may employ more or fewer heuristics.

Once applicable operation(s) are identified at block 404, process control proceeds to block 406 where one of the identified applicable operations is selected. At decision block 408, if the selected operation is an action operation 410, process control proceeds to block 412 and valid source selection(s) are identified in the expression. With reference back to FIG. 5 to serve as an example of this identification, process control identifies that selection 508 the first portion 502 of the expression 500 is a valid source selection to enable the relevant action operation(s) (e.g., actions 510-514 of FIG. 5). Other exemplary expressions may include multiple relevant source selections that enable actions.

Figure 5:
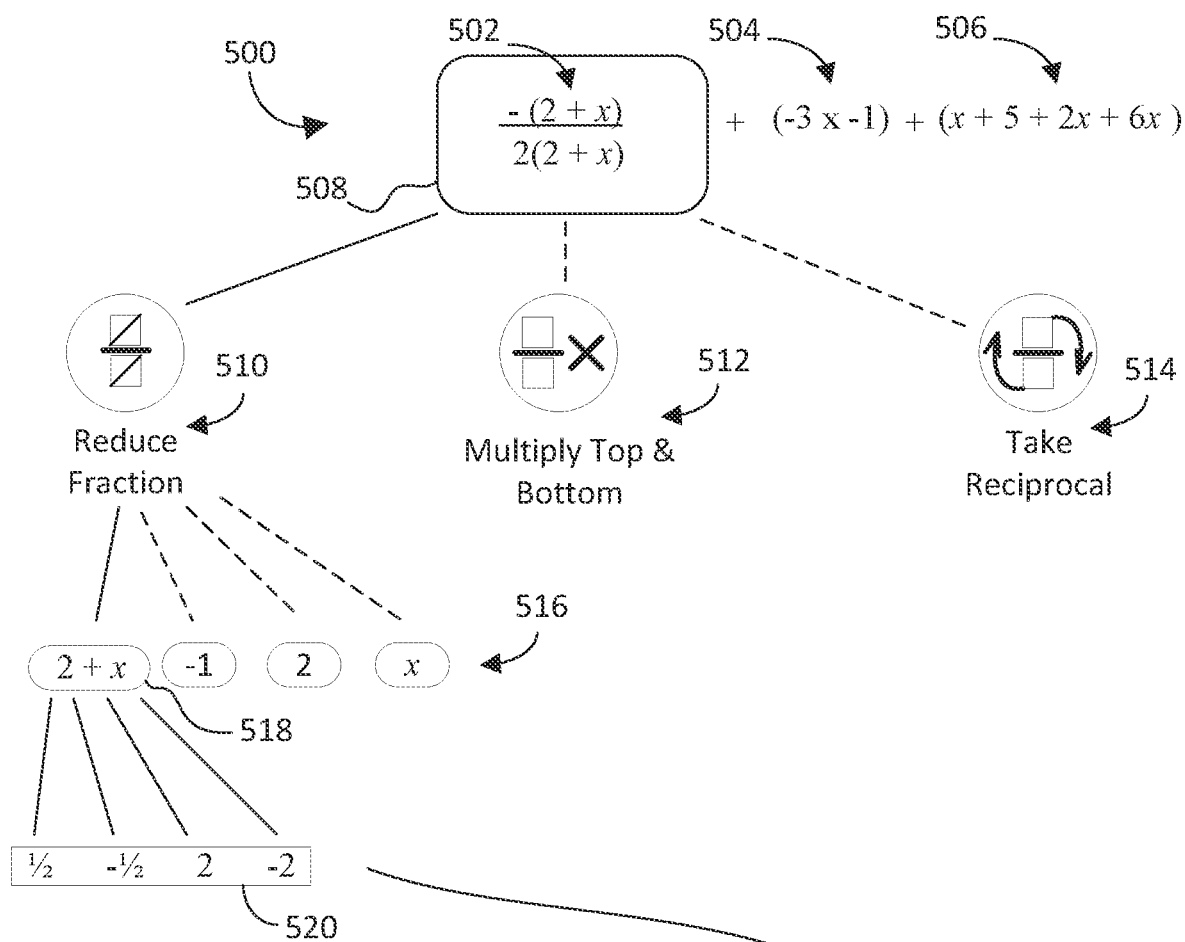
FIG. 5 illustrates an exemplary scenario relevant to FIG. 4.

Once valid source selection(s) relevant to the selected applicable operation (block 406 of FIG. 4) are identified at block 412, process control proceeds to block 414 to determine choices (if any) and the next possible expression(s) or outcomes. That is, process control determines possible choices and each possible outcome that would result from each choice. Referring once again to FIG. 3B as an example, process control had previously determined that three action choices 314-318 would be provided when the source selection 310 is made. However, as represented in FIG. 5, choices can be multi-level in the sense that the act of the user making one choice (e.g., reduce fraction 510) may reveal another set of choices 516 (see also, e.g., choices 320-326 of FIG. 3C) and selection of one of those choices (e.g., the "2+x" choice 518) reveals yet another set of choices 520 (see also, e.g., choices 328 of FIG. 3D). While three levels of choices are shown, other expressions may allow for more or fewer levels of choice.

Regardless the level of choices, processes control determines each action choice (if any) at block 414 of FIG. 4. In addition to determining 414 all possible action choices that could stem from the relevant source selection, process control also determines all possible expression outcomes at block 414 that could result from each possible decision tree stemming from each action choice. With regard to FIG. 5, a portion of possible expression outcomes 522 that may result from the source selection 508 of the first portion 502 of the expression is shown. These possible outcomes were initiated by first selecting 508 the first portion 502 of the expression 500, then selecting the first action 510, and in turn selecting the first choice 516 from the resulting choices 516, which in turn caused four choice 520 to be presented for selection. As such, four expression outcomes are possible 522, each stemming from one of the four respective choices 520.

There are, however, other possible outcomes. For example, each of the other remaining choices 516 could result in respective possible outcomes.

Further, each of the two remaining actions 512, 514 could also yield a plurality of possible choice expression outcomes. As such, the determination of possible expression outcomes can be extensive and computationally intensive. Since, however, these determinations are being made on the back-end computing system, the user device (front-end system) need not have the computational power to carry out these determinations.

As discussed above, process control determines the choices (if any) and possible expression outcomes that are associated with the relevant action operation 414. If, however, the selected applicable operation 406 is instead a manipulation operation 416, process control proceeds to block 418 and each valid source selection/destination site pair, which is associated with the selected applicable operation (406), is identified.

A source selection, as described above, is a portion of an expression (including the entire selection) that may be selected by a user. A destination site refers to a site to where the user may move the source selection. Once the source selection is moved to a destination site, choices may be presented to the user, some sort of mathematical operation may be carried out, or the expression may be rearranged. For example, with regard to FIG. 5, the third portion 506 of the expression 500 allows for additive manipulation operations. At least x, 5, 2x, and 6x are valid source selections. The x source selection may be moved to 2x or 6x to carry out addition (i.e., x+2x or x+6x). As such, x, 2x is a valid selection/destination pair and x, 6x is another valid selection/destination pair.

Further, x may simply be moved to a different location to rearrange the third portion 506 of the expression 500. Each of these possible different locations also result in a valid source selection/destination pair. For example, a user could select x (source selection) and move x to a destination that is located between 5 and 2x to reorder the third expression to "5+x+2x+6x." This valid source selection/destination pair includes the source selection x and the destination between 5 and 2x. Alternatively, x could be selected and moved to a destination between 2x and 6x, being another valid selection/destination pair, which would reorder the third portion to "5+2x+x+6x." Still further, source selection x and a destination after 6x is yet another valid selection/destination pair that would reorder the third portion to "5+2x+6x+x." As such, source selection x has five valid source selection/destination pairs (two via addition and three via rearrangement).

For similar reasons, a source selection of 2x yields five valid source selection/destination pairs and a source selection of 6x also yields five valid source selection/destination pairs.

A source selection of "5", on the other hand, has only three valid source selection/destination pairs, each simply resulting in a rearrangement of the third portion 506 of the expression 500. That is, by manipulating "5", the third portion 506 ("x+5+2x+6x") may be rearranged to "5+x+2x+6x", "x+2x+5+6x", or "x+2x+6x+5".

While the example above proceeds by identifying valid source selection/destination pairs in the third portion 50 of the expression 500, the identification would proceed through the entire expression 500 to identify all valid source selection/destination pairs associated with the selected applicable operation (406). As appreciated, depending on the expression in question, the list of identified valid source selection/destination pairs can be quite extensive and computationally intensive. Fortunately, it is the back-end computing system, not the user device (front-end system) that carries out the identification(s).

Referring back to FIG. 4, after each valid source selection/destination pair is identified 418, process control proceeds to block 414 where choices (if any) for each of the manipulation(s) (i.e., possible source selection/destination pairs) are determined along with possible outcomes (resulting new expressions). That is, for each selection/destination pair, choices are determined (if any) and expression outcomes are determined for each choice. For those instance where choices are not provided (e.g., manipulations that simply rearrange an expression), expression outcomes are also provided.

Figure 6:
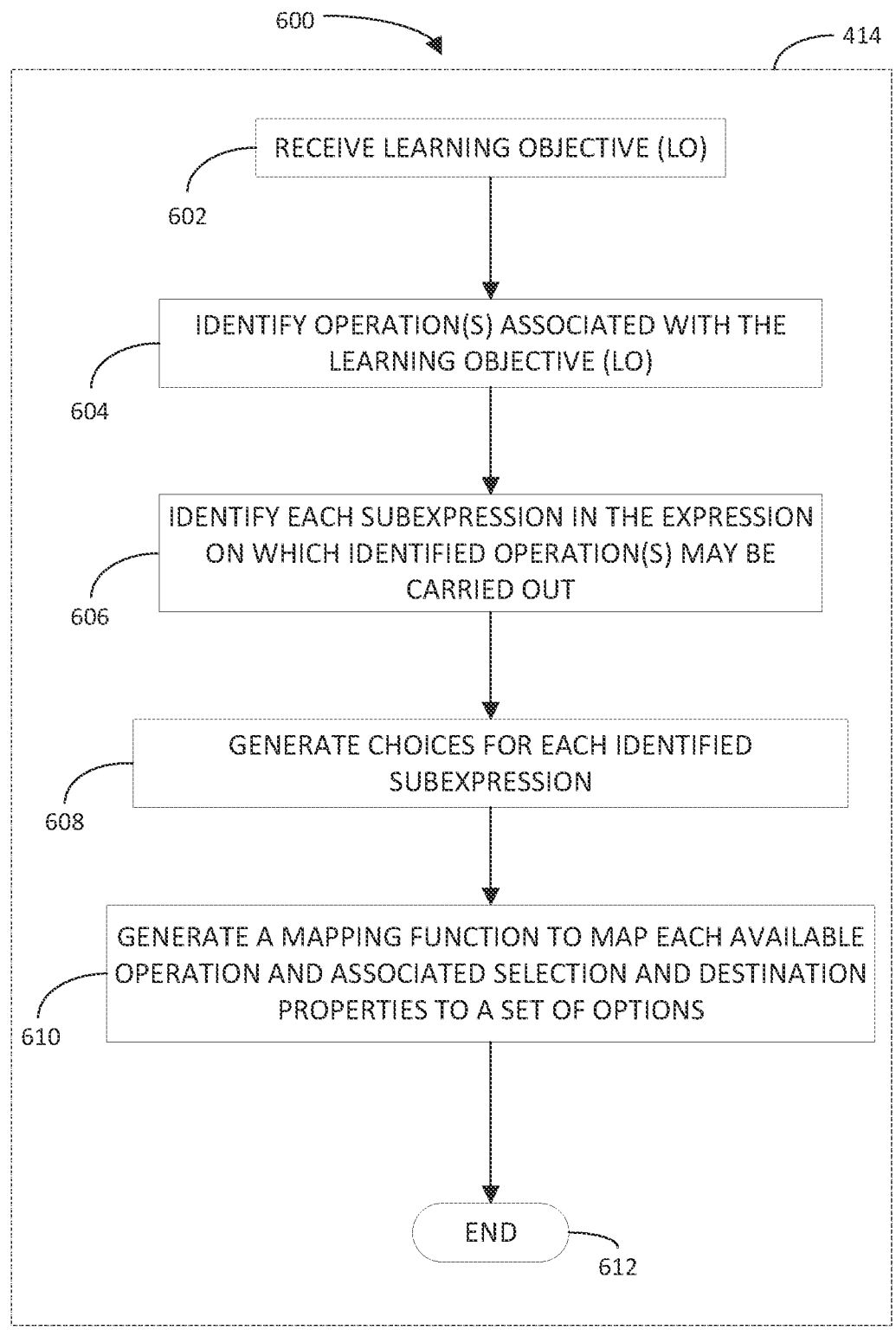
FIG. 6 illustrate an exemplary technique for determining choices.

Further details regarding choice determinations will be set forth below with respect to FIG. 6.

At block 420 of FIG. 4, process control determines if all applicable action and manipulation operations identified at block 404 have been evaluated. If not 422, process control proceeds back to block 406, where an unevaluated applicable operation from the identified operations 404 is selected and evaluated (e.g., see 408-414).

Generally, multiple mathematical operations are determined at block 404. As such, the back-end computing system generally determines at least i) a first mathematical operation a user may carry out on a first subexpression of a first mathematical expression (412 or 418) and ii) a second mathematical operation the user may carry out on a second subexpression of the first mathematical expression (412 or 418).

If all applicable operations have been evaluated 424, process control proceeds block 426, where user experience (UX) information is provided from the back-end computing system (e.g., remote system 102 of FIG. 1) to the front-end system (e.g., user device 106 of FIG. 1) via a network connection (e.g., the network connection 116 of FIG. 1). The UX information includes instructions for all possible or allowed valid source selections for actions and source selection/destination pairs for manipulations, all possible choices that may be provided to the user while interacting with the expression, and all possible expression outcomes that the user may cause via interacting with the expression. In other words, the UX information includes instructions for all allowable or possible mathematical operations that may be carried out on the expression by the user, as well as all "choices" and all possible outcomes stemming from each possible operation and choice. The mathematics application operating on the user device then employs the UX information/instructions as the user manipulates the expression.

While the back-end system may need extensive computational power to create the UX information, the user device does not need nearly as much computational power to employ the UX information. As such, a technical advantage of the system (e.g., system 100 of FIG. 1) is that the back-end system minimizes the processing or computational load on the user device. Accordingly, a large variety of user devices may be employed since the user device need not have the computational power to carry out the heavy lifting (e.g., technique 400).

With continued reference to FIG. 4, after providing the UX information to the user device, process control determines whether or not a new expression has been received from the user device at block 428. If process control determines a new expression (or a new set of expressions) has been received 430, process control continues back to block 404 where technique 400 continues with a new expression. For example, after receiving the UX information, the user may have carried out some act on the expression, thus causing a new expression to be created. The mathematics application would automatically send this new expression to the back-end system where technique 400 would continue on the new expression to determine another set of UX information that would be provided to the user device or mathematics application before the user engages with the new expression.

By employing a computationally robust back-end system, the new UX information can be created and sent to the user device without any appreciable delay.

The above-described technique 400 continues until the back-end system does not receive 432 a new expression, at which time it proceeds to an END 434.

As set forth above, the back-end system determines UX information for an expression and then provides 426 the UX information relevant to that expression to the user device. This is repeated each time a new expression is received by the back-end system. Generally, after a user completes a step, a new expression is provided to the back-end system and UX information is determined for that new expression unless that expression is submitted as a "final" answer.

Accordingly, the back-end system operates on one expression (or one set of expressions) per user at a time. While it may be possible to create a system that determines one set of UX information that includes a tree of all possible expression outcomes for every possible step that may be taken during the entire problem solving process, such a task may be very computationally intensive and require costly computing power. As such, another technical advantage of technique 400 is that the computational load on the back-end system, and costs associated therewith, can be minimized since technique 400 creates UX information for each expression submitted and not for all possible expressions that could branch from a single expression.

While technique 400 has been described in the context of a single user, the back-end system is configured to operate in conjunction with a plurality of user devices. That is, a plurality of users may be engaged with their respective mathematics applications operating on their respective devices. Further, users may be interacting with different expressions and directives. As such, for each user, the back-end system is carrying out technique 400 and technique 400 is repeated each time a new expression is provided (see, e.g., block 402 and 430) per user. Accordingly, the back-end system is a computationally robust system able to engage with a plurality of user devices and respective mathematics applications. Nonetheless, technique 400 minimizes the computational load on the back-end system since only one mathematical expression (or set of expressions) is operated on per user.

As discussed above with respect to FIG. 4, the back-end system determines choices (block 414 of FIG. 4) that may be provided (e.g., choices 226-232 of FIG. 2D) to the user as the user interacts with an expression. An exemplary technique 600 for determining choices (e.g., block 414 of FIG. 4) provided to a user is set forth in FIG. 6.

With respect to exemplary technique 600, process control begins at block 602 where the back-end computing system (e.g., the back-end computing system 102 of FIG. 1) receives a learning objective (LO) from a front-end system (e.g., via the mathematics application 104 of the user device 106). The LO could be, for example, an objective to learn about orders of operations or fraction reduction. After receipt of the LO, process control proceeds to block 604 where the mathematical operations that are associated with the received LO are identified or determined. If, for example, the LO is 'order of operations', the operations for distributing a product over an additive may not be associated with the LO, but several operations for combining additive and multiplicative expressions may be associated with the LO. Whether or not a type of mathematical operation is associated with a LO may be predetermined. For example, subject matter experts may be employed to define what type of mathematical operations would be associated with each LO.

Generally, it is determined that a plurality of mathematical operations is associated with a LO. As such, the back-end computing system identifies or determines that these mathematical operations are associated with the LO. Since the back-end computing system has determined which of the available operation(s) are associated with the LO, it has also determined which operation(s) are not associated with the LO.

After identifying what operation(s) are associated with the LO, process control proceeds to block 606 to identify each subexpression in the expression on which the identified operations(s) may be carried out. That is, for each operation that is associated with the current LO, process control will identify the allowable source selections (i.e., the part or parts of the expression the user can select to carry out the identified operation(s)). For example, if the LO is 'simplify fraction', process control will identify each subexpression in the expression where simplify fraction operations can be carried out.

A pattern matcher may be employed to search the list of each possible interactions associated with the active expression and identify each mathematical operation that is relevant to the LO. For example, a pattern matcher may search the expression for a sub-expression form that is relevant to the LO (e.g., search for the a/b form when the LO is to 'reduce fraction(s)') anywhere within the expression that the user is working on.

A compute specification authored by subject matter expert(s) may be employed to limit the identified subexpression(s). For example, with regard to a 'reduce fraction(s)' LO, a subject matter expert (SME) specification may determine that only certain special types of fractions, as well fractions that have a common factor between their numerator and denominator, are candidates for this operation. Special cases or exceptions may also be integrated into the SME specification (e.g. 0/0, 1/1, a/1, and/or etc.). For example, a pattern matcher may identify "5/10" in an expression and determine that it is within the scope of a 'reduce fraction(s)' LO since "5/10" can be simplified (reduced).

Alternatively, it may be determined that "½" within the expression is not within a 'reduce fraction(s)' LO since it cannot be simplified.

After identifying each subexpression in the expression where the identified operations(s) may be carried out, process control proceeds to block 608 to generate choices for each of these identified subexpression(s). As such, a plurality of choices (see, e.g., choices 214 of FIG. 2B, choices 226-232 of FIG. 2D, choices 230 of FIG. 2G, choices 320-326 of FIG. 3C, or choices 328 of FIG. 3B) is generated for each potential operation or interaction in the expression that is associated with the LO, but not for potential operations not associated with the learning objective.

Accordingly, as the user interacts with the expression, only those interactions associated with the LO will produce choices. Conversely, those interactions not associated with the LO will not produce choices. As such, the user will spend more time focusing on interactions related to the LO than interactions not related to the LO. Interactions or operations not related to the LO may, for example, be interactions the user has already shown competence in during a previous engagement with the mathematics system.

Regarding potential choices, if the operation is an action, i.e. the user makes a source selection and then taps an icon to carry out an operation (e.g., 314-318 of FIG. 3C), process control will compute the relevant choice tree, including distractor or incorrect choices (if any). As an example, in the case of a 'simplify fraction' LO, the first plurality of choices may include one or more factors by which to divide the numerator and denominator (see, e.g., choices 320-326 of FIG. 3C), and then once a factor has been chosen, the next choices may include possible outcomes (e.g., choices 328 of FIG. 3D). If incorrect choices are included, they may represent common mistakes (e.g., 330, 334, 336) a user may make.

If the potential operation is a manipulation, i.e., the user makes a source selection and then drags it somewhere else within the expression, process control also calculates all the possible destinations for this drag operation. Then, for each possible source/destination pair, process control will compute the relevant choice tree (e.g., choices 238 of FIG. 2G) for that manipulation to present to the user if the operation is initiated by the user. As such, a plurality of sets of choices is generated. That is, a set of choices for each possible manipulation associated with the LO is generated.

The set of choices generated for these manipulation interactions generally include at least one valid and one invalid outcome for each respective potential manipulation associated with the LO.

The generated choices may, for example, depend on the nature of the operation, properties of the arguments of the operation such as, for example, the sign of a coefficient or a subexpression's placement within a larger expression (e.g., whether or not the subexpression is the denominator of some larger expression), and/or the source selection and (if applicable) the destination site.

Expression fragments located by the pattern matcher when determining if the expression is a candidate for a given operation or interaction may be employed to construct the choices to be presented to the user. As mentioned above, the choices may include both mathematically valid choices and may also include errors in the form of one or more mathematically invalid choices.

At block 610, information about which operations are associated with the LO and each generated list of choices is employed to generate a mapping function (e.g., f(operation, properties of the selection/destination pair)⇒ provide a set of choices). The mapping function maps each available operation and associated selection and destination properties to a set of choices (a.k.a. options) or a null set of choices (i.e., no choices for those operations not associated with the LO). In other words, the mapping function maps all possible choices to each possible operation that is associated with the LO. As mentioned above, not all the interactions or operations that a user may carry out on the expression may be associated with the LO. As such, only those interactions associated with the LO will result in choices being provided to the user.

After the mapping function is generated, process control of the choice determination technique 600 comes to an END 612. It is noted that the generated mapping function is part of the UX information that is provided to the user device at block 426 of technique 400 of FIG. 4. Accordingly, the back-end system provides the user device all interactions that will be allowed, a plurality of sets of choices, and a map of where each set of choices will be presented as part of the UX information.

As discussed above with respect to FIG. 4, the UX information is determined by processor(s) of the back-end system each time the user changes the expression. Since the back-end system determines the UX information, these computationally heavy operations associated with the mathematics system are carried out by the back-end computing system. As such, the processing loads on each user device is minimized since the computationally intensive tasks are offloaded to the back-end system. Since the back-end system does the heavy lifting for techniques 400 and 600, a technical advantage of such a system is that a wide variety of user devices may be employed to engage with the system since these user devices do not need to have the computational strength to carry out these techniques.

Figure 7:
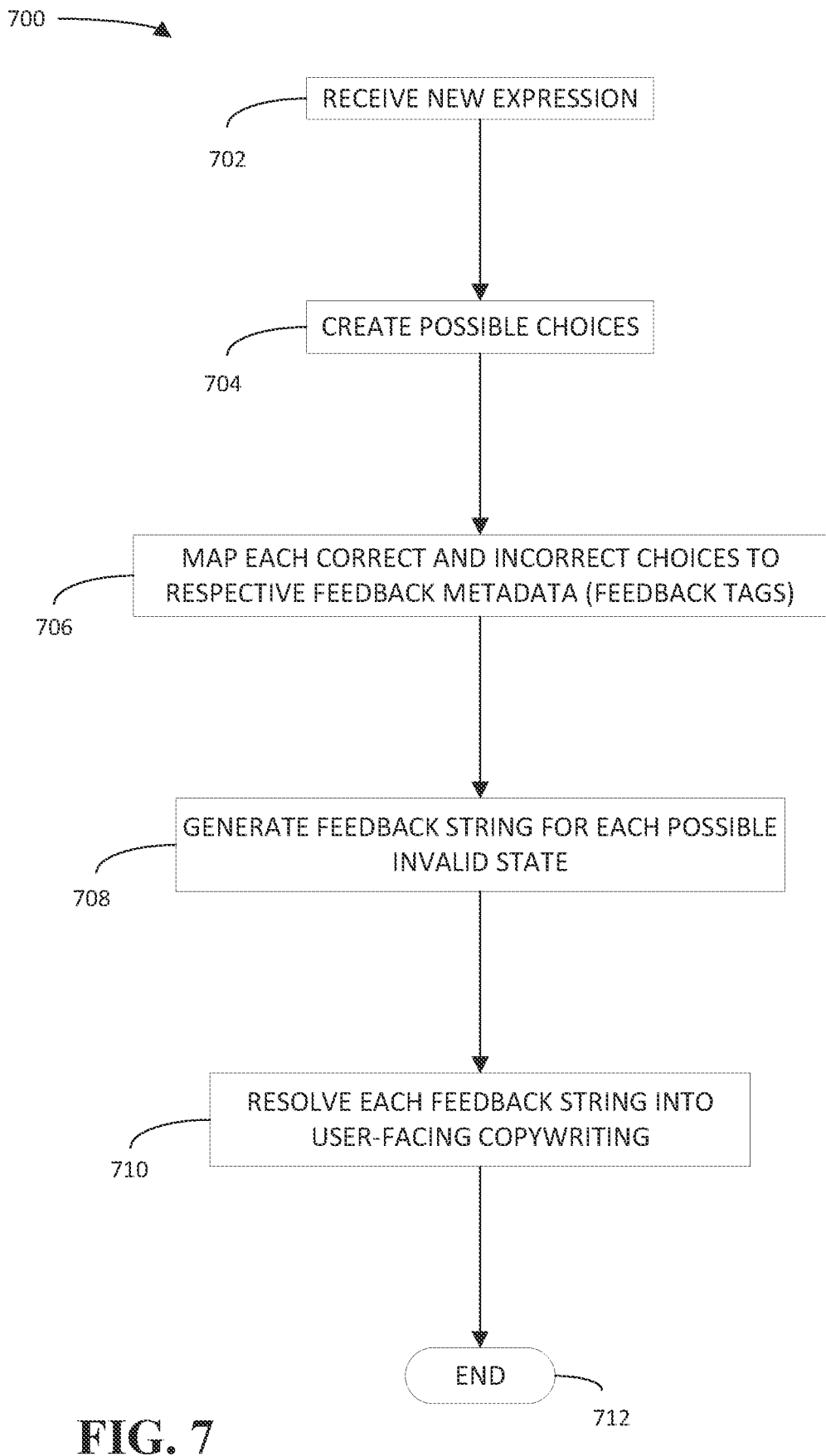
FIG. 7 illustrates an exemplary feedback technique.

Referring now to FIG. 7, an exemplary feedback technique 700 is illustrated. As discussed above with respect to FIG. 2I, the math system may provide feedback 258 to a user interacting with the system. The exemplary feedback technique 700 of FIG. 7 may be carried out by the back-end system to enable to feedback to be given to a user by the front-end system.

The exemplary feedback technique 700 begins at block 702 where a new expression is received by a back-end system (e.g., the back-end system 102 of FIG. 1). This new expression (e.g., expression 402 or 430 of FIG. 4) may be provided to the back-end system by the front-end system (e.g., the user device 106).

Upon receiving the new (active) expression, process control causes the creation of the choices (e.g., block 414 of FIG. 4, technique 600 of FIG. 6) at block 704 of FIG. 7. Proceeding then to block 706, each invalid choice (if any) is mapped to feedback metadata. Accordingly, each possible invalid state (incorrect choice) that the user may transform an expression to using a given operation is generated with some feedback metadata. The feedback metadata consists of tags (i.e., labels describing the nature of the expression and/or the operation carried out by the user) and variables (i.e., parts of the expression acted on by the operation). The tags are defined in such a way to describe aspects of the expression or operation that may be relevant to identifying the mistake the user made.

After mapping all choice possibilities, a feedback string is then authored for each relevant combination of feedback tags for each invalid state the user may transform the expression to at block 708. In other words, process control authors a feedback string for each invalid state the user may transform the expression to based on selection of an incorrect choice. The feedback string may integrate additional information from the expression (e.g., variables such as the selection chosen by the user or the operation carried out by the user) as part of the string to help identify and correct the mistake the user made.

At block 710, process control resolves each feedback string into user-facing copywriting. For example, process control may lookup raw copywriting text associated with relevant tags, and then splice LaTeX representations of the variables into that copywriting text to produce the final form (now containing inline math relating to the expression being processed) that will be displayed to the user for any given invalid choice that may be made while interacting with the active expression.

Upon resolving each feedback string into user-facing copywriting, process control proceeds to an END 712.

The information generated via exemplary technique 700 becomes part of the UX information that is sent to the user device (e.g., 426 of FIG. 4). Accordingly, the UX information that is sent to the user device also includes feedback (e.g., feedback 258 of FIG. 2I) that can be presented to the user for any invalid state the user may transform the expression to.

Performing exemplary technique 700 can be quite computationally intensive. Likewise, as previously discussed, the implementation of exemplary techniques 400 and 600 respectively of FIGS. 4 and 6 can also be computationally intensive. By leveraging a robust back-end system (e.g., a system that employs AWS®) to carry out these computationally intensive techniques, the load on the user device can be minimized. In other words, and with reference to FIG. 1, though the mathematics system 100 carries out computationally intensive tasks, a technical advantage is that the user 110 need not have a device 106 that is able to carry out these intensive tasks. Rather, the back-end system 102 of the mathematics system 100 can be employed to carry out the most demanding tasks quickly and efficiently. A less robust user device can then employ the UX information (instructions) so the user can engage with the mathematics system with little or no delay, thus minimizing user frustration and increasing user satisfaction.

Figure 8:
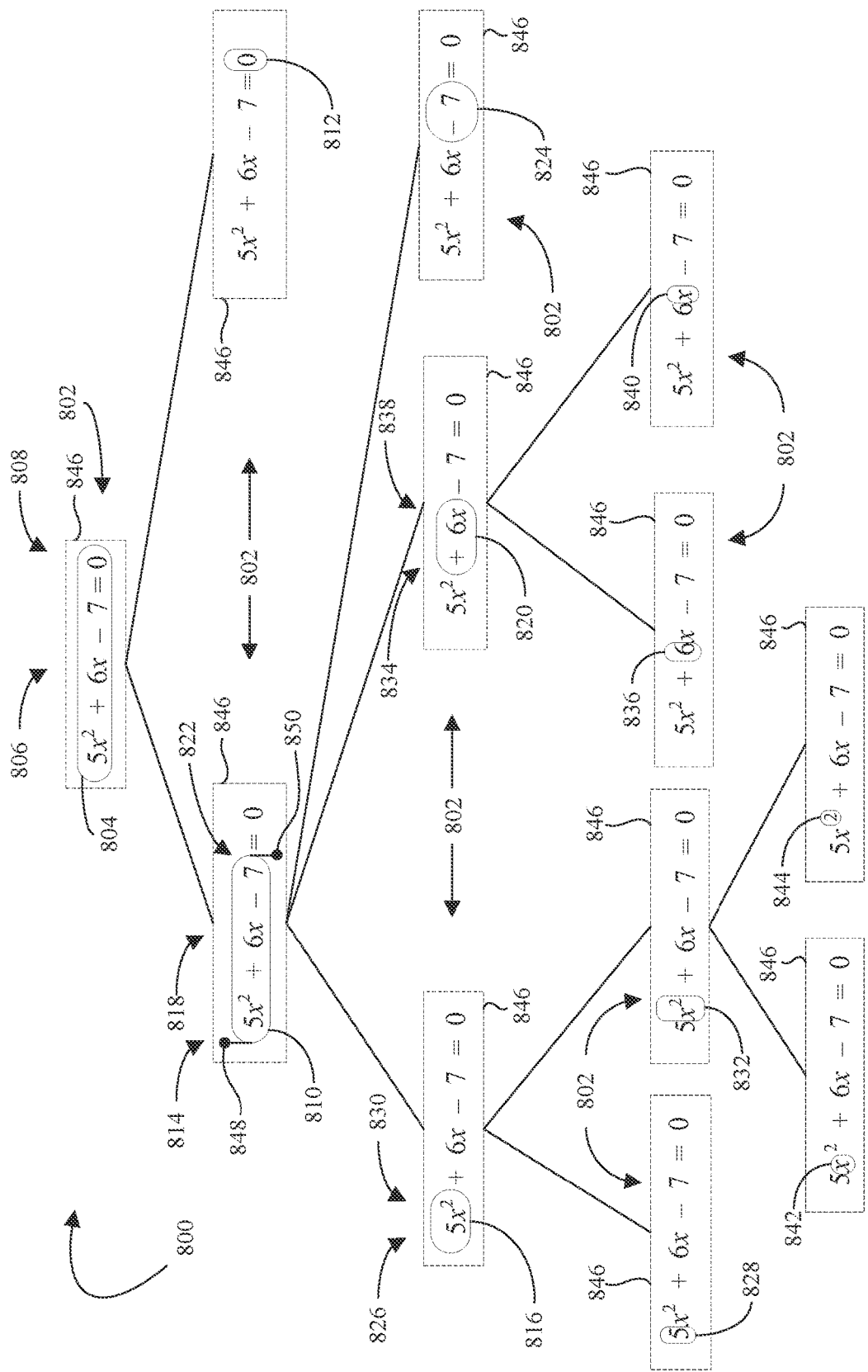
FIG. 8 illustrates an exemplary descendant tree of an exemplary mathematical expression and an exemplary technique for interacting with the exemplary mathematical expression.

With reference now to FIG. 8, an illustration is shown representing a technique 800 to enable a user to efficiently and intuitively interact and manipulate expressions on the user's device (e.g., the user device 106 of FIG. 1). This technique 800 may be carried out on a mathematics application (e.g., the application 104 of FIG. 1) on a user device.

As shown in FIG. 8, an exemplary expression 802 is presented: $5x^2+6x-7=0$. A tap (via mouse, finger, or etc.) on the first expression 802 causes selection thereof as represented by an indicator 804. This indicator 804, as well as indicators discussed below, are shown as an oval around the expression 802 or portions thereof. Other indicators, however, could be employed. For example, changing the font color of the expression or portions thereof could serve as an indicator.

With continued reference to FIG. 8, the exemplary expression 802 includes subexpressions on a left side 806 of the equal sign (=) as well as on a right side 808 on the equal sign. After the expression 802 is selected 804, if a user taps on the left side 806 of the equal sign the expression on the left side 806 will be selected as represented by a left-side indicator 810. Alternatively, after the expression 802 is selected 804, if a user taps on the right side 808 of the equal sign, the entire right side of the exemplary expression 802 will be selected as represented by a right-side indicator 812. Since only the zero (0) is on the right side 808, only the zero is selected. In other instances where the expression has additional terms on the right side, however, the indicator would encompass those terms as well. Further, other expressions may include additional equal signs and selections of subexpressions between equal signs would work in a similar manner.

As described above, the left side 806 of the expression 802 may be selected by tapping the left side 806 of the indicator 804 and the right side 806 may be selected by tapping the right side 808 of the indicator 804. It is noted that the selectability of a sub-expression is determined by whether or not there is an operation the user can perform with that sub-expression. If there is not an operation the user can perform on the subexpression, it will not be selected.

With continued reference to technique 800, the user can easily engage with the terms of the expression 802 after the expression has been selected 804. For example, if a user taps on or within the left-side indicator 810 near a "$5x^2$" position 814, the "$5x^2$" subexpression will be selected as represented by a "$5x^2$" indicator 816. Likewise, if a user taps on or within the left-side indicator 810 near a "6x" position 818, the "6x" subexpression will be selected as represented by a "6x" indicator 820. Following the same strategy, if a user taps on or within the left-side indicator 810 near a "−7" position 822, the "−7" subexpression will be selected as represented by a "−7" indicator 824.

Depending on the expression, a user may be able to continue to drill down into the expression. For example, if a user taps on or within the "$5x^2$" indicator 816 near a "5" position 826, the "5" subexpression will be selected as represented by a "5" indicator 828. Alternatively, if the user taps on or within the "$5x^2$" indicator 816 near an "$x^2$" position 830, the "$x^2$" subexpression will be selected as represented by a "$x^2$" indicator 832.

The "5" subexpression and the "$x^2$" subexpression can be referred to as siblings of each other and these siblings can be referred to as children of the "$5x^2$" term.

Following a similar strategy, the user may tap the "6x" indicator 820 on or near a "6" position 834 to cause selection of the "6" subexpression as shown by a "6" indicator 836. Similarly, the user may engage with the "+6x" indicator 820 near an "x" position 838 to cause selection of the "x" subexpression as represented by an "x" indicator 840. The "6" subexpression and the "x" subexpression can each be referred to as siblings of each other. Further these siblings can be referred to as to as children of the "6x" subexpression. Similar nomenclature can be used for other subexpressions. For example, the user may engage with different sides of the "$x^2$" indicator 632 to select one of its children as represented by an "x" indicator 842 and an exponent indicator 844.

Accordingly, through a series of taps or inputs on relevant indicator(s), a user may be able to drill down to specific subexpression(s) represented in the exemplary expression 802. If the user makes a mistake, or simply changes his or her mind, the exemplary technique 800 allows for changes to be made. For example, if a user has the "5" subexpression selected 828, the user may tap on its sibling (the "$x^2$" subexpression) to cause selection 832 thereof, thus causing the "5" subexpression to be deselected. Similarly, if a user has the "x" subexpression selected 840, the user may tap on its sibling (the "6" subexpression) to cause selection 836 thereof, thus causing the "x" subexpression to be deselected.

In addition to the "sibling" and "children" nomenclature discussed above, an "ancestor of a selected subexpression" nomenclature can be used to refer to any previously selected subexpression in the chain above the presently selected subexpression. For example, if the "5" subexpression is selected 828, its ancestors are the previously selected 816 "$5x^2$" subexpression, the previously selected 810 "$5x^2+6x-7$" subexpression, and the previously selected 804 "$5x^2+6x-7=0$" expression.

With this nomenclature in mind, if a user has selected a sibling and then taps on a non-sibling, then the child of the lowest common ancestor closest to where the user tapped will be selected. For example, if the selected subexpression is "5" 828 and the user taps on the "6" subexpression (a non-sibling), the lowest common ancestor of these subexpressions (i.e., "5" and "6") is the "$5x^2+6x-7$" subexpression and the child of this lowest common ancestor closest to where the user tapped is "+6x". As such, this act would deselect the "5" subexpression and select 820 the "+6x" subexpression (i.e., the child of the lowest common ancestor that is closest to where the user tapped).

Deselection may also be carried out through implementation of a selection area or zone 846 employed by the mathematics application. Inputs (e.g., tapping, mouse click, or etc.) on and/or within the selection zone 846 will be interpreted as an intent to make a selection. Inputs outside the selection zone 846, however, will be interpreted as intent to make a deselection and a selection of the parent of the deselected term. If there is no parent available, then deselection will occur without another selection being made. While FIG. 8 represents the selection zone 846 as a visible rectangle, other examples may employ different shapes and may or may not be visible to the user.

To serve as a deselection/selection example, if the squared exponent term is selected 844, a user input outside the selection zone 846 will cause deselection of the exponent and selection of its parent (i.e., selection 832 of the "$x^2$" subexpression). As another example, if the user had previously made the "+6x" selection 820 and then inputs outside the selection zone 846, the "+6x" subexpression will be deselected and the "$5x^2+6x-7$" subexpression will be selected 810. That is, the parent of the "+6x" subexpression will be selected.

Selection and deselection may also be carried out by the use of drag handles. For example, the indicator 810 encompassing the "$5x^2+6x-7$" subexpression illustrates a left-hand drag handle 848 and a right-hand drag handle 850. Drag handles (e.g., the left-hand and right-hand drag handles 848, 850) may appear when there are two or more siblings of the current selection (including the selection). In other words, drag handles may appear when a non-empty subset of siblings is selected from a level on which there are two or more siblings. It is noted that the drag handles 848, 850 of FIG. 8 are merely exemplary and may instead take on different shapes.

By manipulating drag handles, the indicator (e.g., the indicator 810 encompassing the "$5x^2+6x-7$" subexpression) can be manipulated such that one or more adjacent sibling subexpressions are selected. For example, the right-hand drag handle 850 may be dragged towards the left-hand drag handle 848 to cause selection of the "$5x^2+6x$" subexpression. That is, "$5x^2$" sibling and the "+6x" sibling are selected by one indicator. If the drag towards the left-hand drag handle 848 is continued, the "$5x^2$" subexpression (sibling) will be selected. Using similar mechanics, the left-hand drag handle 848 may be dragged towards the right-hand drag handle 850 to first cause selection of both the "+6x" sibling and the "−7" sibling (i.e., selection of the "+6x−7" subexpression), and then cause selection of just the "−7" sibling as the drag continues.

As shown in FIG. 8, plus and minus signs are included in selections (e.g., the "+6x" selection 820 and the "−7" selection 824). However, division and multiplication signs will not be included in selections. Further, though not shown in the example set forth in FIG. 8, when an expression includes parentheses, the parentheses themselves will be selected when everything within the parentheses is selected.

Next, whether drag handles or one or more inputs (e.g., tap(s)) are employed, mathematical order of operations define branches in a descendant tree (see, e.g., the descendant tree of FIG. 8 showing siblings, children, and etc.). Operators able to be written sequentially with no break in format, due to commutativity (including (+−) acting as a multiplicative factor) are capable of non-binary branching. Several examples follow to further illustrate the sibling nomenclature and branching. The expression "$2xi(x+1)\sqrt{5}$" with implicit multiplication operators has five siblings. The expression "$2\times5\div9\times7$" with explicit multiplication operators and a division by obelus (i.e., ÷) operator has four siblings. The expression "$5+x-\Pi+i$" with the plus and minus operators has four siblings. The expressions "$a=b=c$" and "$a<b<c$", each with equality operators have three siblings. The expressions "$A\cup B\cup C$" and "$A\cap B\cap C$", respectively with union and intersection operators, each have three siblings.

Though unary negations, exponents, and radicals can be written sequentially with no break in format as a convenience, they include implicit parentheses that create branches. For example, the expression "− − − − − 3" includes implicit parentheses as follows: "− (− (− (− (−3))))". The expression "$2^{\wedge}3^{\wedge}3^{158}\,3^{\wedge}3^{\wedge}3$" includes implicit parentheses as follows: "$((((2^{\wedge}3)^{\wedge}3)^{\wedge}3)^{\wedge}3)^{\wedge}3$". And yet another example including square root operators, the expression "$\sqrt{\sqrt{\sqrt{\sqrt{\sqrt{\sqrt{x}}}}}}$" includes implicit parentheses as follows: "$\sqrt{(\sqrt{(\sqrt{(\sqrt{(\sqrt{(\sqrt{x})})})})})}$".

As discussed above, once a selection (see, e.g., the selections 804, 810, 812, 816, 820, 824, 828, 832, 836, 840, 842, or 844) is made, a user can carry out some sort of manipulation or action with the selection on the user device. As such, technique 800 enables an efficient and intuitive interaction between a user device and its user.

As set forth above, expression and subexpression manipulation on the user device can be carried out through a series of inputs (e.g., taps) and through use of drag handles. Additional selection and drag handle mechanics are discussed below with respect to FIGS. 9A-10D.

Figure 9A:
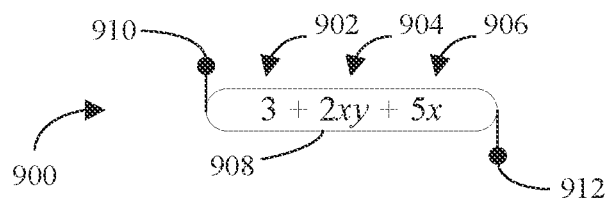
FIGS. 9A-9E illustrate exemplary interactions with an exemplary mathematical expression.
Figure 9B:
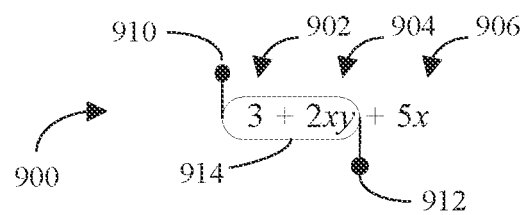
Figure 9C:
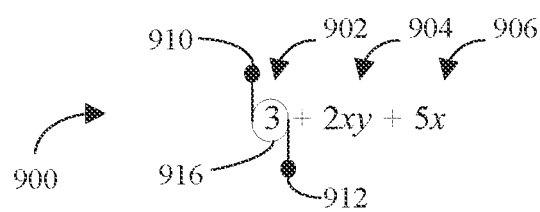
Figure 9D:
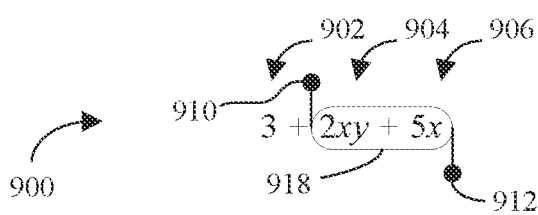

With reference is to FIG. 9A. An exemplary expression 900 ("$3+2xy+5x$") having three siblings (i.e., "3", "$+2xy$", and "$+5x$") 902, 904, 906 is shown. Encompassing the expression 900 is a first selection indicator 908. Displayed on the selection indicator 908 is a left-hand drag handle 910 and a right-hand drag handle 912. The drag handles 910, 912 may be employed to select siblings. For example, if the right-hand drag handle 912 is dragged to the left, the first selection indicator 908 will switch or snap to a second selection indicator 914 to encompass the "$3+2xy$" subexpression (i.e., the "3" sibling 902 and the "$+2xy$" sibling 904) as shown in FIG. 9B. If the drag to the left is continued, the second selection indicator 914 will switch to a third selection indicator 916 to encompass the "3" subexpression as shown in FIG. 9C. Since the drag handles 910, 912 are employed to select siblings, the "x" or "y" will not be individually selected.

Figure 9E:
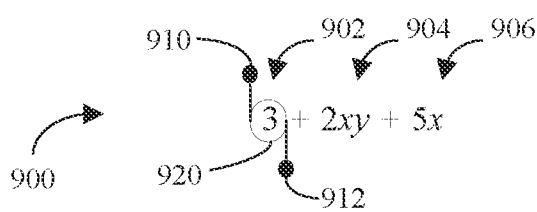

Dragging one handle through the other may be allowed. However, when they overlap there will still be a selection and effectively the handle dragged will skip the occupied position such that there is not an empty selection. For example, with reference to FIG. 9D, a selection indicator 918 has been manipulated to encompass two siblings (i.e., the "$+2xy$" sibling 904 and the "$+5x$" sibling 906) of a three-sibling expression: "$3+2xy+5x$". If the right-hand drag handle 912 is dragged past the left-hand drag handle 910, a selection indicator 920 will appear around the "3" sibling 902 as shown in FIG. 9E.

Figure 10A:
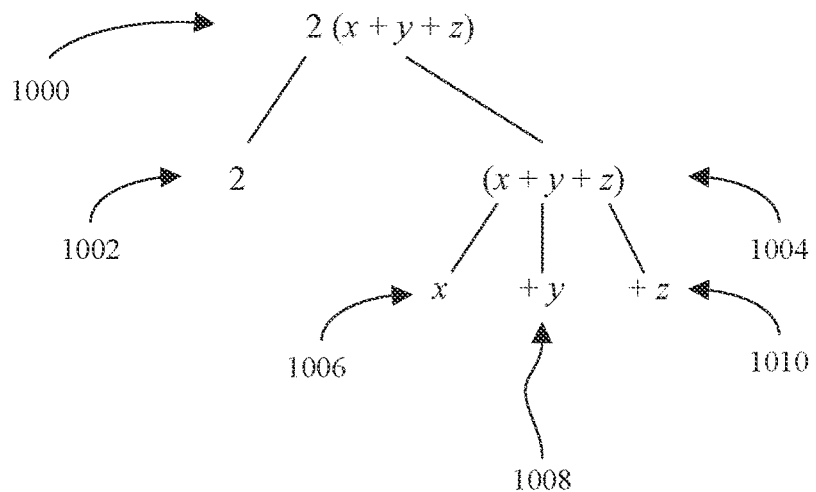
FIG. 10A illustrates an exemplary descendant tree of an exemplary mathematical expression.

With reference now to FIGS. 10A-10D, further mechanics of drag handle operation are shown. FIG. 10A illustrates a hierarchal relationship (i.e., a descendant tree) among subexpressions in an exemplary expression 1000. The expression 1000 (i.e., $2(x+y+z)$) has two children 1002, 1004 comprising the "2" subexpression 1002 and the "$(x+y+z)$" subexpression 1004. Accordingly, the children 1002 and 1004 are siblings to each other. The "$(x+y+z)$" subexpression 1004 itself has three children 1006, 1008, 1010, which are each siblings to each other.

If a drag handle is dragged to a position that puts it outside the original group of siblings, both handles will snap to encompass an ancestor's set of siblings at that higher level on the tree, regardless of how many siblings exist at that level (even if less than three). If the non-dragged handle only partially encompasses a sibling on this new higher level, it will snap to encompass the remaining node/sibling at this new level, leaving, for example, a faint phantom handle in the original position that it can always snap back to in case the dragged handle is dragged back to that original level.

Figure 10B:
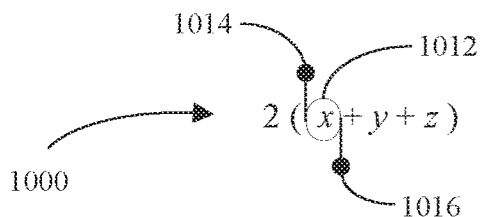
FIGS. 10B-10D illustrate exemplary interactions with the exemplary mathematical expression of FIG. 10B.
Figure 10C:
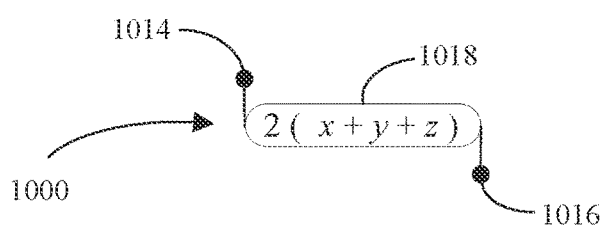

Take, for example, a selection 1012 of the "x" term shown in FIG. 10B having a left drag handle 1014 and a right drag handle 1016. If the left drag handle 1014 is dragged left to encompass even a part of a node outside the current sibling, such as to the left of "2", the entire expression 1000 will be selected 1018 as shown in FIG. 10C. In other words, the ancestor/parent (i.e., the "$x+y+z$" subexpression) will be selected along with the parent's sibling (e.g., "2").

Figure 10D:
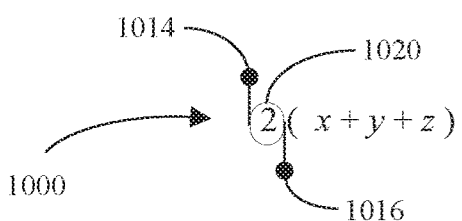

If a drag handle is dragged to a position where it could lie between siblings on a lower level of descendants, it does not snap to that level as shown among FIGS. 10C and 10D. For example, with reference to FIG. 10C, if the right drag handle 116 is dragged to the left, neither "x", "+y", or "+z" will be included in a selection since they are on a lower level of descendants (see lower levels siblings 1006-1010 of FIG. 10A). Rather, the "2" term will be selected as shown by a selection indicator 120 represented in FIG. 10D.

As shown in FIGS. 8-10D, user selection and/or deselection of expressions and subexpressions, may be efficiently and intuitively carried out on a user device. Accordingly, a technical advantage of the mechanics and techniques shown is that the user device is enabled to interact with the user in an efficient and intuitive manner during the problem solving process.

With reference now back to FIGS. 1-10D discussed above, exemplary system(s) and devices may be any computing system and/or device that includes a processor and a memory (e.g., the memory 116 of FIG. 1). Computing systems (e.g., remote system 102 of FIG. 1) and/or devices (e.g., user device 106 of FIG. 1) generally include computer-executable instructions (e.g., interactive mathematics education application 104 of FIG. 1), where the instructions may be executable by one or more computing devices such as those listed above and below. Computer-executable instructions (e.g., the interactive mathematics application 104 of FIG. 1) may be compiled or interpreted from computer programs created using a variety of programming languages and/or technologies, including, without limitation, and either alone or in combination, Java™, C, C++, Visual Basic, Java Script, Perl, etc. The exemplary system(s), device(s), and items therein may take many different forms and include multiple and/or alternate components. While exemplary systems, devices, and modules are shown in the Figures, the exemplary components illustrated in the Figures are not intended to be limiting. Indeed, additional or alternative components and/or implementations may be used, and thus the above examples should not be construed as limiting.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OS X and iOS operating systems distributed by Apple Inc. of Cupertino, California, the BlackBerry OS distributed by Research In Motion of Waterloo, Canada, and the Android operating system developed by the Open Handset Alliance. Examples of computing systems and/or devices include, without limitation, personal computers, cell phones, smart-phones, super-phones, tablet computers, next generation portable devices, handheld computers, secure voice communication equipment, or some other computing system and/or device.

Further, the processor or the microprocessor (e.g., the at least one CPU 118 of FIG. 1) of computing systems and/or devices receives instructions from the memory and executes these instructions, thereby performing one or more processes, including one or more of the processes described herein. Such instructions and other data may be stored and transmitted using a variety of computer-readable mediums (e.g., the memory 116 of FIG. 1).

A CPU or processor may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the user device 106 and/or the CPU 118 of FIG. 1 may include any one of, but not limited to single, dual, triple, or quad core processors (on one single chip), graphics processing units, visual processing units, and virtual processors.

Memory (e.g., the memory 116 of FIG. 1) may be, in general, any computer-readable medium (also referred to as a processor-readable medium) that may include any non-transitory (e.g., tangible) medium that participates in providing data (e.g., instructions) that may be read by a computer. Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With further regard to FIGS. 1-10D and the processes, systems, methods, techniques, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

The invention claimed is:

1. A back-end computing system configured to offload processing loads from a user computing device, the back-end computing system having a non-transitory computer-readable medium storing instructions executable by one or more hardware processors to:
   identify, via the one or more hardware processors, at least i) a first mathematical operation a user may carry out on a first subexpression of a first mathematical expression while interacting with a mathematics application on the user computing device and ii) a second mathematical operation the user may carry out on a second subexpression of the first mathematical expression while interacting with the mathematics application on the user computing device, wherein the user computing device is geographically remote from the back-end computing system;
   identify, via the one or more hardware processors, which subexpressions of the first mathematical expression the user will be able to move in the first mathematical expression illustrated on the user computing device such that a plurality of source selections are identified, wherein identification of the plurality of source selections is based in part on the identification of the first mathematical operation;
   determine, via the one or more hardware processors, where the user will be allowed to move the identified subexpressions among the first mathematical expression illustrated on the user computing device such that a plurality of destination sites is identified;

determine via the one or more hardware processors i) a first inaccurate outcome of performing the first mathematical operation incorrectly on the first mathematical expression and ii) a first accurate outcome of performing the first mathematical operation correctly on the first mathematical expression;

provide, via a network connection, user experience (UX) instructions to the mathematics application, wherein the UX instructions include the plurality of source selections, the plurality of destination sites, the first inaccurate outcome, and the first accurate outcome, and wherein the UX instructions minimize processing loads on the user computing device as the user interacts with the first mathematical expression; and receive, via the network connection, a second mathematical expression from the mathematics application, wherein the second mathematical expression is based on movement of the first subexpression illustrated in the first mathematical expression on the user computing device from one of the plurality of source selections to one of the plurality of destination sites and a selection of one of the first inaccurate outcome and the first accurate outcome by the user.

2. The back-end system of claim 1 wherein the UX instructions sent from the back-end computing further include instructions to cause the mathematics application to display, for user selection, at least the first inaccurate outcome and the second inaccurate outcome on the user computing device when the user causes the first subexpression to move from a first location in the first mathematical expression to a second location in the first mathematical expression on the user device, and wherein i) one of the source selections of the plurality of source selections corresponds with the first location and ii) one of the destination sites of the plurality of destination sites corresponds with the second location.

3. The back-end computing system of claim 1 storing further instructions executable by the one or more hardware processors to receive, from the mathematical application, an indication of a learning objective (LO) associated with the first mathematical expression.

4. The back-end computing system of claim 3 storing further instructions executable by the one or more hardware processors to:

determine a plurality of mathematical operations that can be carried out on the first mathematical expression to minimize processing loads on the user computing device, wherein the first mathematical operation and the second mathematical operation are included in the plurality of mathematical operations; and identify which of the plurality of mathematical operations are associated with the LO and which of the plurality of mathematical operations are not associated with the LO, wherein the first mathematical operation and the second mathematical operation are associated with the LO.

5. The back-end computing system of claim 4 storing further instructions executable by the one or more hardware processors to identify each subexpression in the first mathematical expression on which the identified plurality of mathematical operations associated with the LO can be carried out.

6. The back-end computing system of claim 5 storing further instructions executable by the one or more hardware processors to:

determine, for the each identified subexpression, a set for choices such that a plurality of sets of choices are determined, wherein each choice in the plurality of sets of choices is user selectable by the user to cause change to the first mathematical expression; and provide, via the UX instructions sent to the mathematics application, the plurality of sets of choices, wherein i) a first set of choices from the plurality of sets of choices comprises the first accurate outcome and the first inaccurate outcome.

7. A method carried out by one or more hardware processors of a back-end computing system, the method comprising:

identifying, via one or more hardware processors, at least i) a first mathematical operation a user may carry out on a first subexpression of a first mathematical expression while interacting with a user computing device and ii) a second mathematical operation the user may carry out on a second subexpression of the first mathematical expression while interacting with a mathematics application on the user computing device, wherein the user computing device is geographically remote from the back-end computing system;

identifying, via the one or hardware processors, which subexpressions of the first mathematical expression the user will be able to move in the first mathematical expression illustrated on the user computing device such that a plurality of source selections are identified, wherein identification of the plurality of source selections is based in part on the determination of the first mathematical operation and the second mathematical operation;

determining, via the one or more hardware processors, where the user will be allowed to move the identified subexpressions among the first mathematical expression illustrated on the user computing device such that a plurality of destination sites is identified;

determining via the one or more hardware processors i) a first inaccurate outcome of performing the first mathematical operation incorrectly on the first mathematical expression and ii) a first accurate outcome of performing the first mathematical operation correctly on the first mathematical expression;

providing, via a network connection, user experience (UX) instructions to the mathematics application, wherein the UX instructions include the plurality of source selections, the plurality of destination sites, the first inaccurate outcome, the and first accurate outcome, and wherein the UX instructions minimize processing loads on the user computing device as the user interacts with the first mathematical expression; and receiving, via the network connection, an indication of a second mathematical expression from the mathematics application, wherein the second mathematical expression is based on moving of the first subexpression illustrated on the user computing device from one of the plurality of source selections to one of the plurality of destination sites and a selection of one of the first inaccurate outcome and the second accurate outcome by the user.

8. The method of claim 7 wherein the UX instructions provided by the back-end computing further include instructions to cause the mathematics application to display at least the first inaccurate outcome and the second inaccurate outcome on the user device when the user causes the first subexpression to move from a first location to a second location on the user device, and wherein i) one of the source selections of the plurality of source selections corresponds with the first location and ii) one of the destination sites of the plurality of destination sites corresponds with the second location.

9. The method of claim 7 further comprising:
determining a plurality of mathematical operations that can be carried out on the first mathematical expression, wherein the first mathematical operation and the second mathematical operation are included in the plurality of mathematical operations;
receiving, from the mathematical application, an indication of a learning objective (LO) associated with the first mathematical expression; and
identifying which of the plurality of mathematical operations are associated with the LO and which of the plurality of mathematical operations are not associated with the LO, wherein the first mathematical operation and the second mathematical operation are associated with the LO.

10. The method of claim 9 further comprising identifying each subexpression in the first mathematical expression on which the identified plurality of mathematical operations associated with the LO can be carried out.

11. The method of claim 10 further comprising:
generating, for the each identified subexpression, a set for choices such that a plurality of sets of choices are determined, wherein each choice in the plurality of sets of choices is user selectable by the user to cause change to the first mathematical expression; and
providing, via the UX instructions sent to the mathematics application, the plurality of sets of choices, wherein i) a first set of choices from the plurality of sets of choices comprises the first accurate outcome and the first inaccurate outcome.

12. A system comprising:
a mathematics application configured to be installed on a user computing device and configured to provide a first accurate choice for user selection and a first inaccurate choice for user selection to a user of the user computing device, wherein i) the first accurate choice represents a first accurate outcome of performing a first mathematical operation on a first mathematical expression and ii) the first inaccurate choice represents a first inaccurate outcome of performing the first mathematical operation on the first mathematical expression on the user computing device; and
a back-end computing system to offload processing loads from the user computing device, the back-end computing system is geographically remote from the user computing device and is configured to:
identify the first mathematical expression based on an expression indication from the mathematics application;
identify, via one or more hardware processors, a plurality of mathematical operations the user will be allowed to carry out on the first mathematical expression, wherein the first mathematical operation is one of the plurality of mathematical operations;
identify, via the one or hardware processors, which subexpressions of the first mathematical expression the user will be able to move in the first mathematical expression illustrated on the user computing device such that a plurality of source selections are identified, wherein identification of the plurality of source selections is based at least in part on the plurality of mathematical operations identified;
determine, via the one or more hardware processors, where the user will be allowed to move the identified subexpressions among the first mathematical expression illustrated on the user computing device such that a plurality of destination sites is identified;
determine via the one or more hardware processors i) at least one inaccurate outcome for each mathematical operation of the plurality of mathematical operations such that a plurality of inaccurate outcomes is determined, wherein the first inaccurate outcome is one of the plurality of inaccurate outcomes and ii) an accurate outcome for each mathematical operation of the plurality of mathematical operations such that a plurality of accurate outcomes is determined, wherein the first accurate outcome is one of the plurality of accurate outcomes;
provide, via the network connection, user experience (UX) instructions to the mathematics application, wherein the UX instructions include the plurality of source selections, the plurality of destination sites, the plurality of inaccurate outcomes, and the plurality of accurate outcomes to the mathematics application to minimize processing loads on the user computing device as the user interacts with the first mathematical expression; and
receive an indication from the mathematics application that represents a second mathematical expression, wherein the second mathematical expression is based on movement of the first subexpression illustrated on the user computing device from one of the plurality of source selections to one of the plurality of destination sites and user selection of one of the first inaccurate outcome and the first accurate outcome.

13. The system of claim 12 wherein the UX instructions further include instructions to cause the mathematics application to display at least the first inaccurate outcome and the first accurate outcome on the user device when the user causes the first subexpression to move from a first location to a second location on the user device, and wherein i) one of the source selections of the plurality of source selections corresponds with the first location and ii) one of the destination sites of the plurality of destination sites corresponds with the second location.

14. The system of claim 12, the mathematical application further configured to provide, via the network connection, a learning objective (LO) to the back-end computing system.

15. The system of claim 14, the back-end computing system further configured to:
identify via the one or more hardware processors i) which of the plurality of mathematical operations the user will be allowed to carry out on the first mathematical expression are associated with the LO and ii) which of the plurality of mathematical operations the user will be allowed to carry out on the first mathematical expression are not associated with the LO.

16. The system of claim 15, the back-end computing system further configured to identify each subexpression in the first mathematical expression on which the identified plurality of mathematical operations associated with the LO can be carried out.

17. The system of claim 16, the back-end computing system further configured to:
determine, for the each identified subexpression, a set for choices such that a plurality of sets of choices are determined, wherein each choice in the plurality of sets of choices is user selectable by the user to cause change to the first mathematical expression; and provide, via the UX instructions, the plurality of sets of choices to the mathematics application, wherein i) a first set of choices from the plurality of sets of choices comprises the first accurate outcome and the first inaccurate outcome.

\* \* \* \* \*